United States Patent [19]

Boutcher, Jr. et al.

[11] 4,363,167

[45] Dec. 14, 1982

[54] METHOD OF TERMINATING LEADING ENDS OF A PLURALITY OF WIRES

[75] Inventors: Andrew G. Boutcher, Jr.; Kenneth F. Folk, both of Harrisburg, Pa.

[73] Assignee: AMP Incorporated, Harrisburg, Pa.

[21] Appl. No.: 176,812

[22] Filed: Aug. 11, 1980

[51] Int. Cl.³ ........................ H01R 43/04; B23P 19/00

[52] U.S. Cl. ........................................ 29/863; 29/755; 29/861; 29/749; 29/566.2; 29/566.3

[58] Field of Search ...................... 29/749, 759, 564.2, 29/566.3, 755, 863, 751, 861, 566.2; 140/140

[56] References Cited

U.S. PATENT DOCUMENTS

| | | | |
|---|---|---|---|
| 3,765,073 | 10/1973 | Burns | 29/749 X |
| 3,871,072 | 3/1975 | Folk . | |
| 3,881,246 | 5/1975 | Folk | 29/863 |
| 3,887,999 | 6/1975 | Ross et al. | 29/863 X |
| 4,043,017 | 8/1977 | Folk et al. | 29/749 |
| 4,136,440 | 1/1979 | Brandewie et al. | 29/749 X |
| 4,137,624 | 2/1979 | Davis et al. | 29/749 X |
| 4,235,015 | 11/1980 | Funcik et al. | 29/749 X |
| 4,253,222 | 3/1981 | Brown et al. | 29/749 X |

*Primary Examiner*—Carl E. Hall
*Assistant Examiner*—Carl J. Arbes
*Attorney, Agent, or Firm*—F. Brice Faller

[57] ABSTRACT

Method and apparatus for cutting and stripping a plurality of wires, applying terminals to the ends of the wires, and inserting wires en masse into the cavities in a connector housing. A shuttle having telescoping tubes which contain the wires therein is attached to carriage which travels on a rail and delivers wires axially at a first fixed spacing on a linear path to an operating zone, insertion station, and strip and shear station. Tubing collapses to extrude wire into operating zone where wires are compensated by deflecting laterally of their axes various amounts such that subsequent rolling into a template will restore the wire ends to a straight array so they can be terminated to a strip of terminals at a second fixed spacing. Tubes expand to draw terminated wires therein as shuttle retreats, then connector housing is delivered onto linear path and shuttle advances to insert terminated wires therein. Shuttle retreats over stationary wires until they are exposed to strip and shear blades remote from housing.

11 Claims, 36 Drawing Figures

181
183
182
174
173
168
170
139
138
60
87
82
83
85
84
12
180
88
86
179
184
154
169
158
172
188
155
156
164
171
152
150
151

Fig. 6G
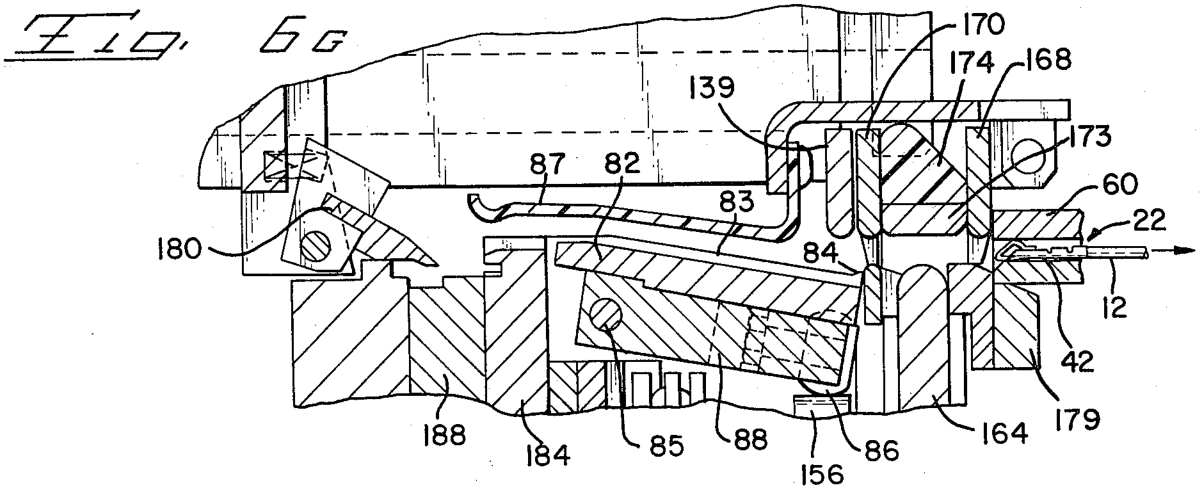
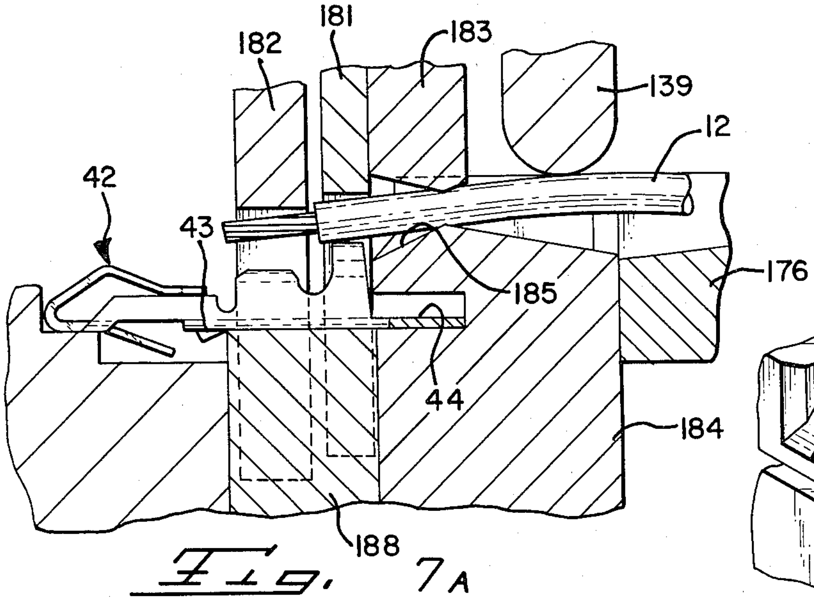
Fig. 7A
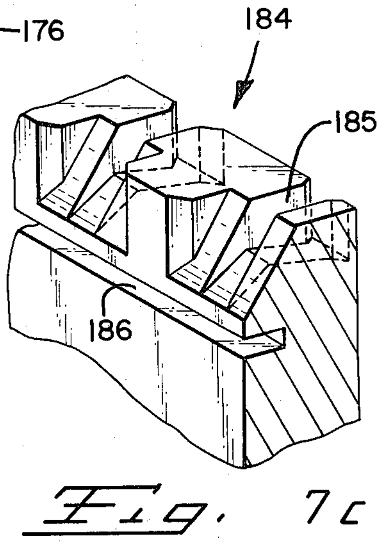
Fig. 7C
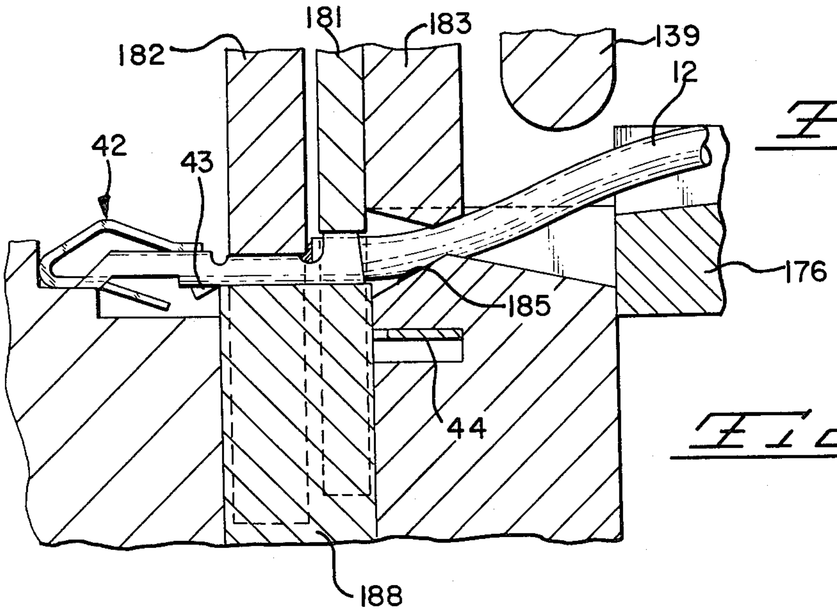
Fig. 7B 10B
22
98
102
103
104
106
108
110
112
113
114
115
116
118
120
121
122
124

TIMING CHART – OPERATING ZONE

METHOD OF TERMINATING LEADING ENDS OF A PLURALITY OF WIRES

BACKGROUND OF THE INVENTION

The present invention relates to a method and apparatus for applying electrical terminals to a plurality of wire leads, assembling the terminated leads into cavities in a connector housing, and cutting and stripping the wires so the operations may be repeated. More particularly, the terminals are applied to the leads at a first center to center spacing and inserted into cavities in a connector at a second center to center spacing in a housing.

Lead making machines are well known. Generally wires are fed one at a time either manually or automatically to a crimping station where electrical terminals are applied. See, e.g., U.S. Pat. Nos. 3,804,603 and 3,686,752. More recently, multi-function machines have been developed which terminate pre-cut and stripped the leads and insert the terminated ends one at a time into cavities in a connector housing whose position is indexed to receive the leads see, e.g., U.S. Pat. No. 4,074,424. The next step was machine which cut and stripped the wire before terminating and inserting see, e.g., U.S. Pat. No. 4,087,908. In this patent the wires are still terminated one at a time and inserted into a connector housing one at a time.

U.S. Pat. No. 4,043,017 represents a major advancement in the art insofar as it discloses an apparatus which terminates a plurality of wires en masse to insulation displacing terminals located in a connector housing. A shuttle is utilized which transports the pre-cut leading ends to a template where the spacing is modified by rolling into thru slots in the template; punches then descend into the slots to push the leads into the terminals in the connector housing below. Other pertinent prior art includes U.S. Pat. No. 3,871,072, which discloses wire spreading by use of a template and substantial variation of lead length by forming bights in the wires. Leading ends of the wires are then sheared to insure proper length differentiation prior to a termination operation.

None of the prior art cited discloses a machine which can cut and strip a plurality of wires en masse, terminate them en masse, and insert the terminated ends into a connector housing en masse.

SUMMARY

The present invention is directed to an apparatus which utilizes a shuttle traveling on linear path to axially transport a plurality of wires at a first center to center spacing to an operating zone where they are terminated to electrical terminals at a second center to center spacing. The shuttle then retracts the terminated wires and inserts them into cavities in a connector housing at the first center to center spacing. The shuttle utilizes telescoping tubes at the first spacing which contain the wires for delivery to the termination and insertion stations. Continued movement of the shuttle when the end of the tubes are stopped at the operating zone causes wires to be extruded through a compensator in the operating zone where they are deflected laterally of their axes to modify the position of the ends of the wires so they can be rolled into a template to obtain the spacing required for termination and at the same time maintain the ends in a straight array. The shuttle then retreats until wires are withdrawn into the tubes, and retreats further so that the connector housing can be placed in the linear path. The shuttle then moves against the housing so that the tubes collapse slightly and extrude the terminated wires into the cavities until the terminals are locked inside, then the shuttle retreats over stationary wires until it clears a stripping and shearing station. Means are provided for partial collapse of the tubing at this point so that the new leading ends may be withdrawn into the tubing again when stripping and shearing are completed.

It is an object of the present invention to provide an apparatus capable of cutting, stripping, terminating, and loading wire leads into a connector housing, all operations being performed on the wires en masse.

It is a further object to terminate wires at a different center to center spacing than that at which they are to be loaded in the connector housing.

It is a further object to maintain the cut and stripped ends of the leads in a straight array for precise positioning over a straight strip of terminals, without additional cutting or stripping after the wires are spread in a grooved template.

It is a further object to provide a wire shuttle which can deliver the wires to work stations at a controlled spacing on a common linear path.

These and other objects and features will be apparent to those skilled in the art after a consideration of the following detailed description taken in conjunction with the accompanying drawings.

THE DRAWINGS

FIG. 1 is a perspective of the harness making apparatus.

FIG. 2A-J are perspectives of the wire, terminals, and connector block showing the operations performed by the apparatus.

FIG. 6G shows withdrawal of terminated leads into header on wire carriage.

FIG. 7A is an enlarged fragmentary cross section of action in FIG. 6E showing gripping of wire immediately prior to termination.

FIG. 7B is similar to 7A, immediately following termination and shearing of the carrier strip.

FIG. 7C is an enlarged fragmentary perspective of the wire gripping tooling and carrier strip shear.

DETAILED DESCRIPTION OF THE PREFERRED EMBODIMENT

Figure 1:
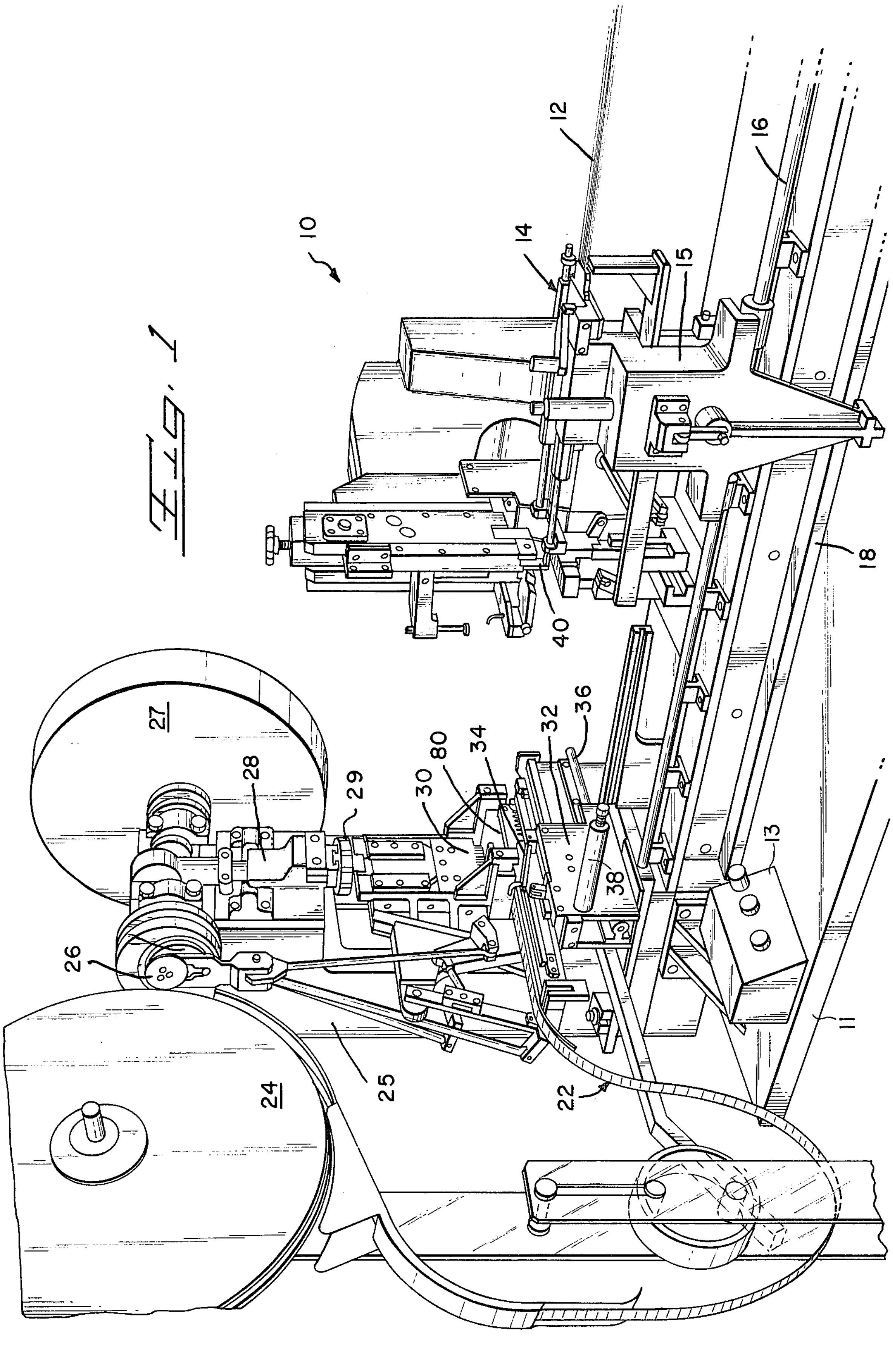

Referring to FIG. 1, the harness making apparatus 10 and control box 13 therefor are mounted to a base 11. A shuttle 14 is fixed to a shuttle carriage 15 which is journaled to a straight cylindrical rail 16 on which the carriage travels, whereby the shuttle 14 travels on a first linear path paralleling the rail 16 and delivers wires 12 through compensator 80. A continuous strip of electrical terminals 22 is delivered from a reel 24 to a termination station behind the compensator 80 where terminals are fixed to the leading ends of wires 12. A drive shaft 26 carrying a flywheel 27 is mounted to a frame 25 which is fixed to base 11. The drive shaft 26 causes terminating ram 28 to reciprocate vertically over the terminating station, which fixes terminals to the wires 12 by the action of an applicator 30, the height of which is adjusted by adjustor 29. Subsequent to termination, the shuttle 14 moves backward on the linear path from the compensator 80 and housing carriage 32 journaled to rail 36 carries a dielectric connector housing on a second linear path into the first linear path where it defines an insertion station. The connector housing is not shown in FIG. 1, but would be fixed to the carriage 32 by clamp 34 and is thus carried to the insertion station. The shuttle 14 then moves forward to insert the terminated wires into the housing, the shuttle carriage 15 being stopped by a stop 38 fixed to the housing carriage 32. The shuttle 14 then moves backward through strip and shear station 40 trailing the wires behind, and the wires are sheared as both the trailing ends and new leading ends are stripped of insulation.

Figure 2A:
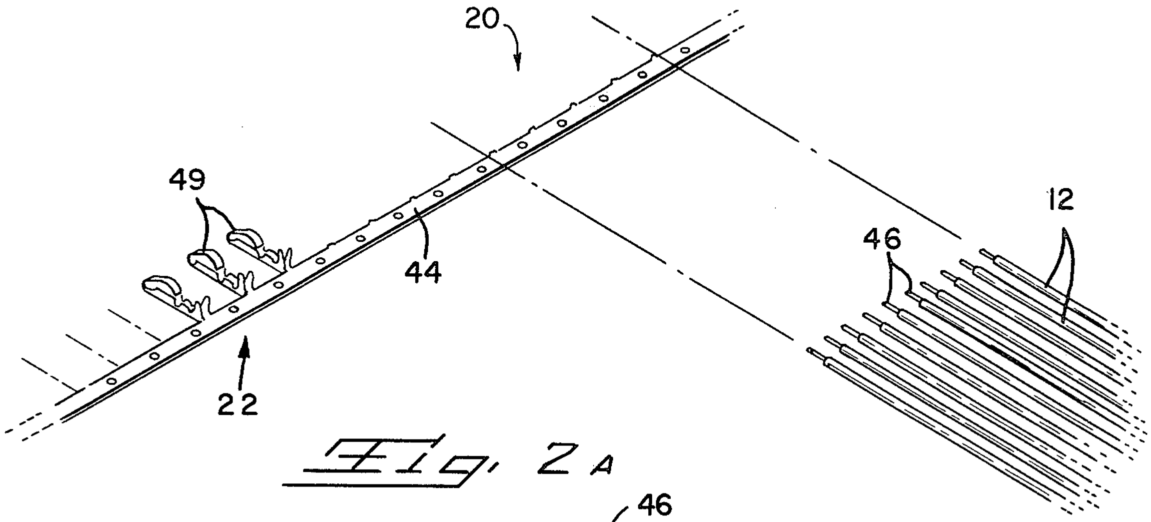
Figure 2B:
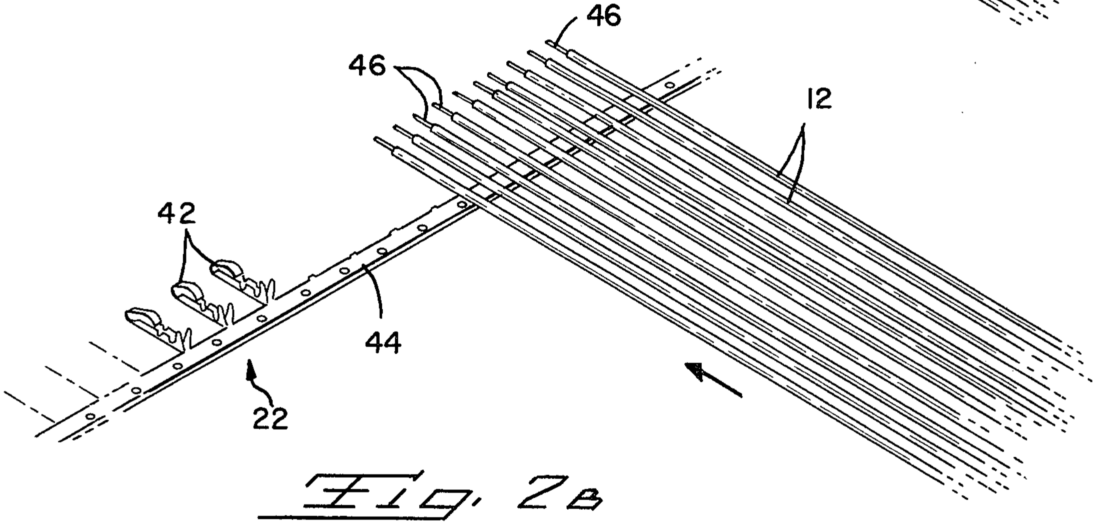
Figure 2C:
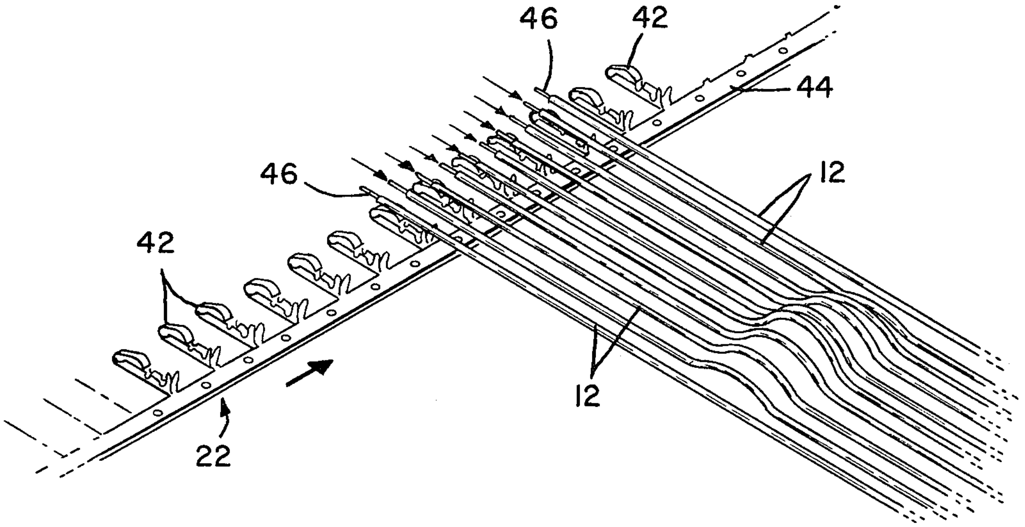
Figure 2D:
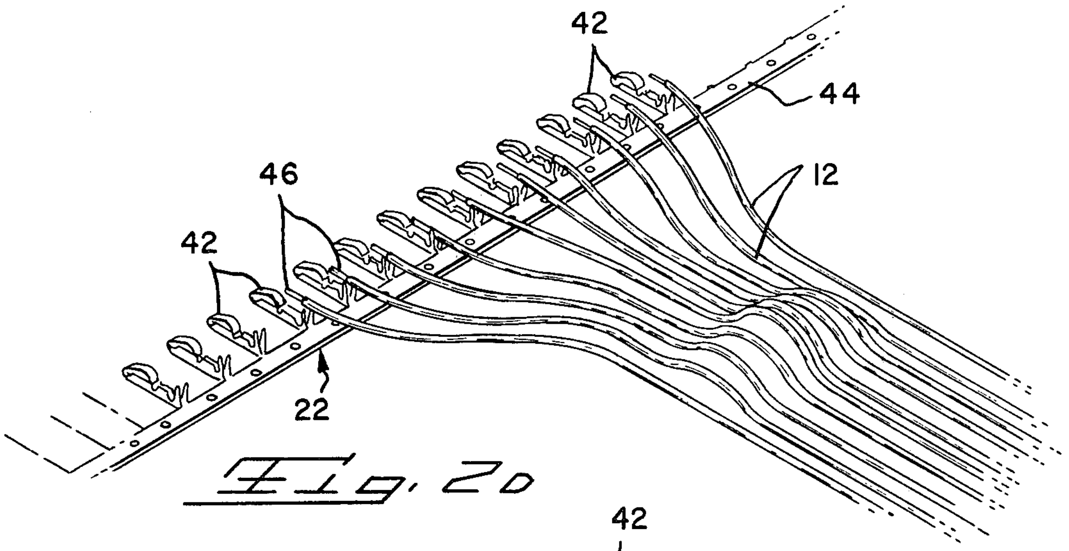
Figure 2E:
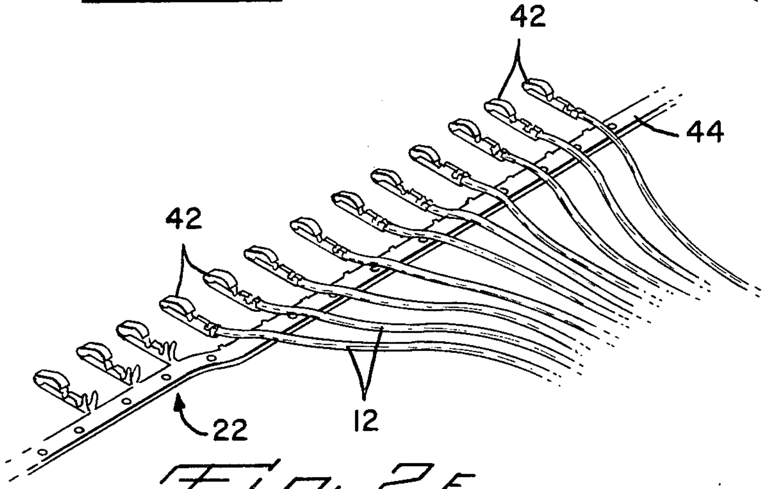
Figure 2F:
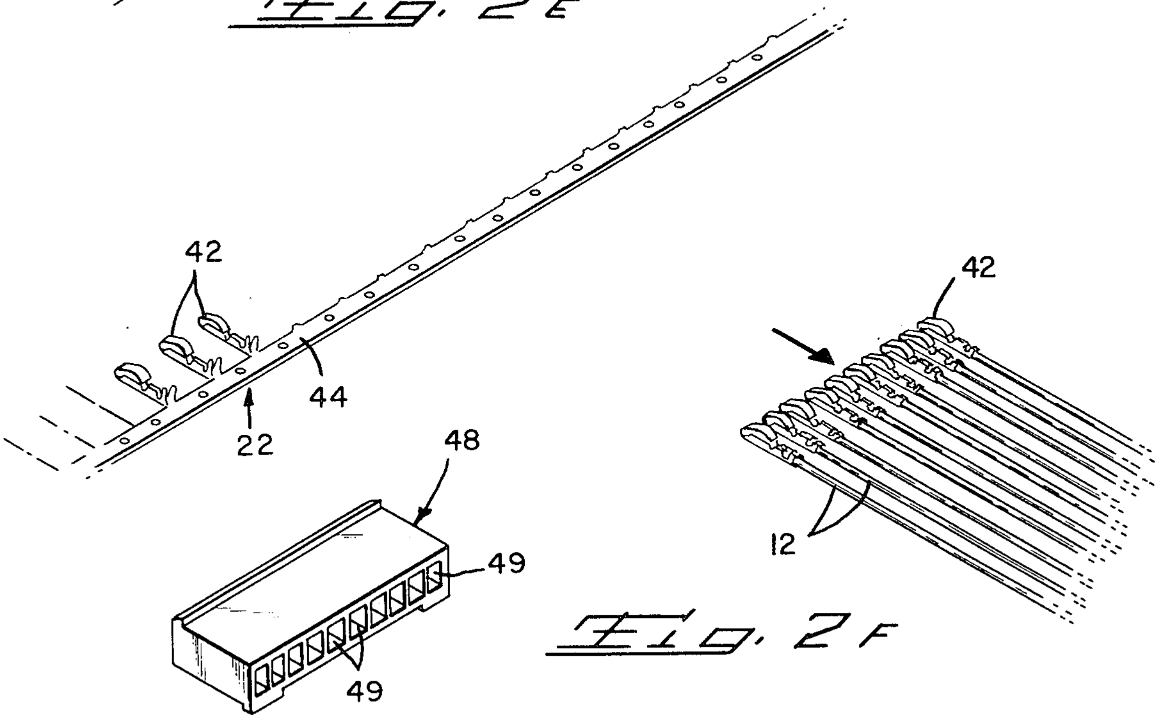
Figure 2G:
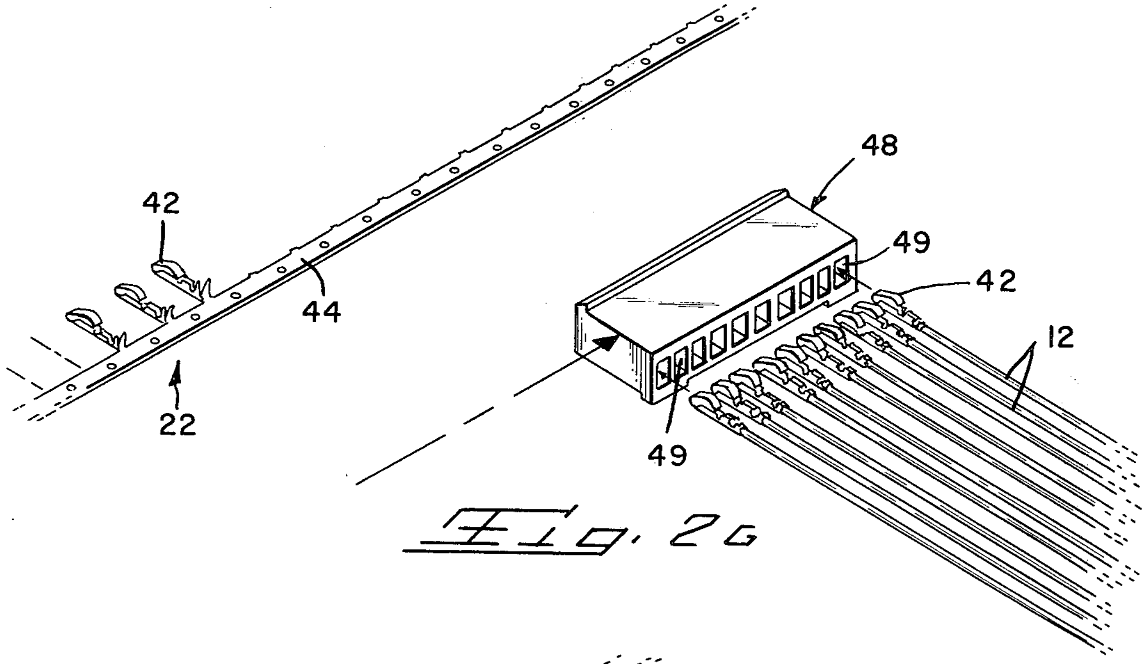
Figure 2H:
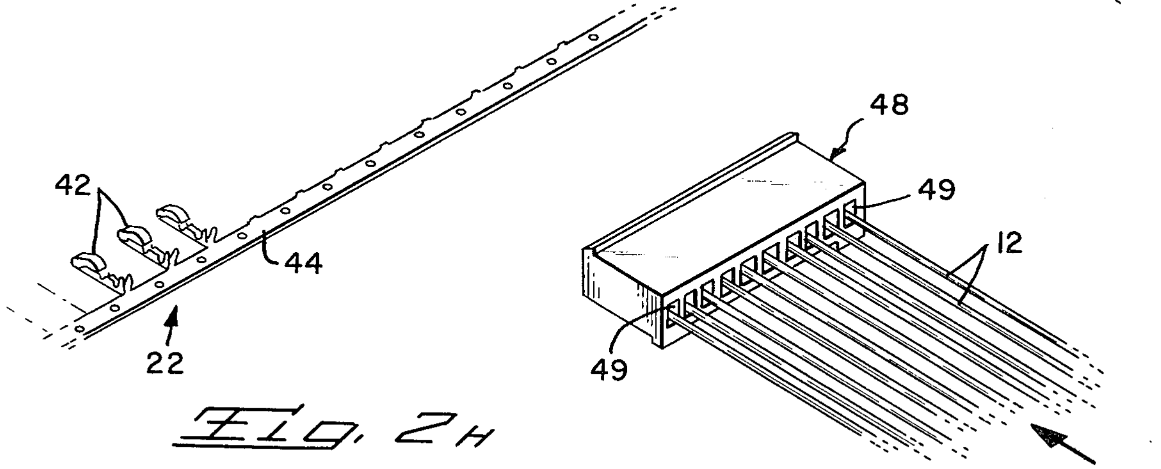
Figure 2I:
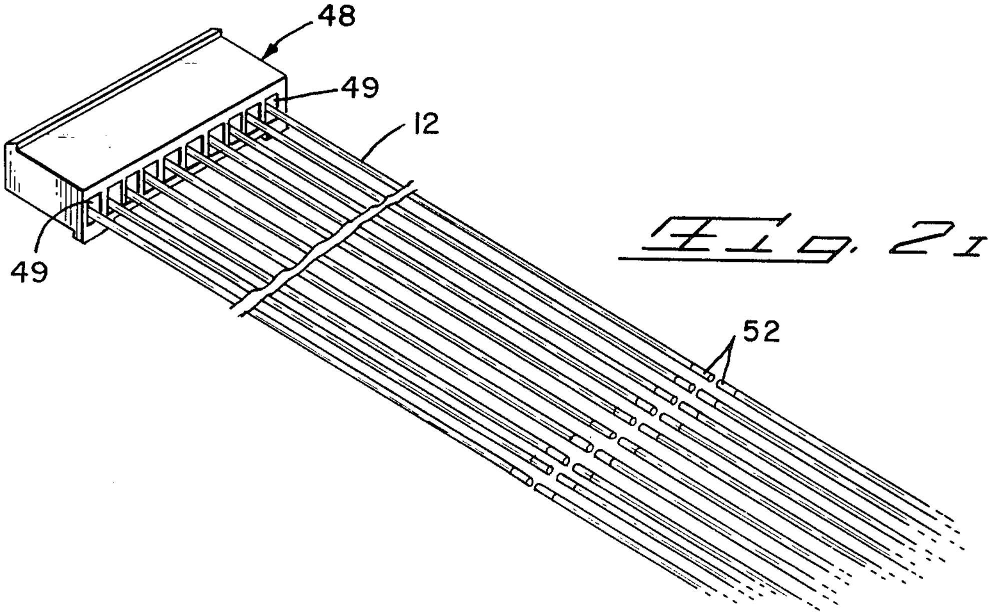
Figure 2J:
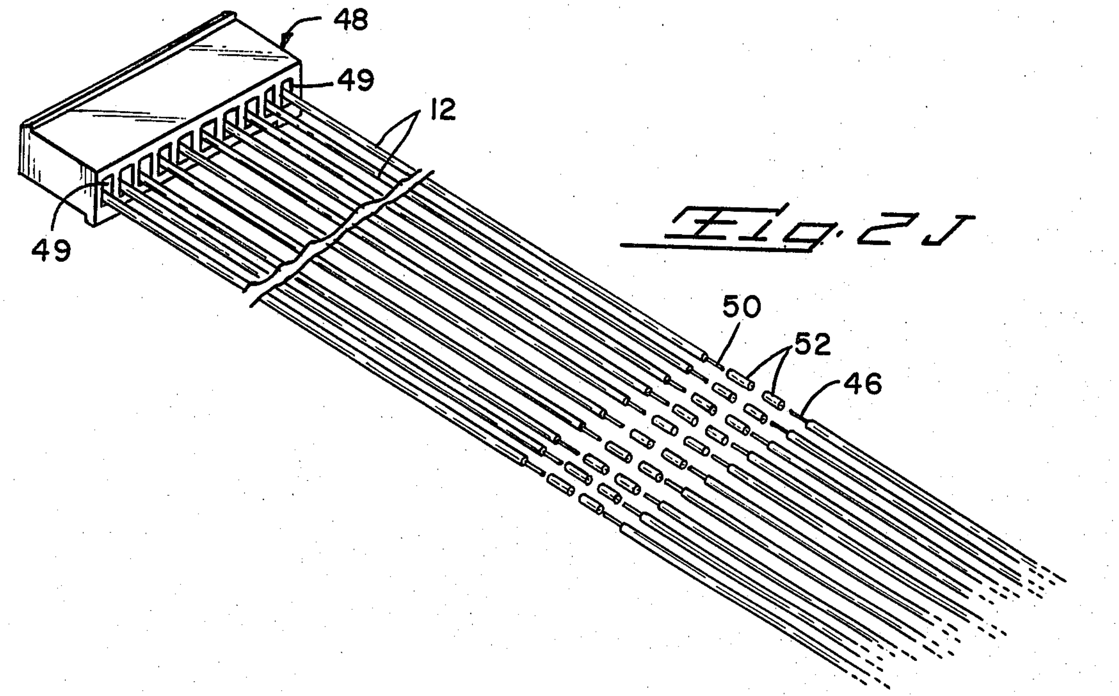

Referring now to FIGS. 2A through 2J, a more detailed description of the operative steps performed on the wires will be given. FIG. 2A shows the wires travelling on the first linear path prior to arrival at the terminating station 20 and also shows the terminal strip 22 which is comprised of terminals 42 fixed to a carrier strip 44. FIG. 2B shows the leading ends 46 of wires 12 as they arrive at the terminating station over a section of carrier strip 44 from which terminals were previously sheared. Note that the center to center spacing of the wires 12 is smaller than the center to center spacing of the terminals 42. FIG. 2C shows the movement of the terminal strip to the terminating station so that a section of the strip having terminals thereon lies beneath the leading ends of the wires. The wires are simultaneously deflected various amounts transversely of their axes so that the leading ends lie in a concave arcuate array as shown. This will hereinafter be referred to as compensation. FIG. 2D shows the spreading of the wires in the plane of their delivery so that the leading ends are again in a straight array and lying directly over the terminals 42 ready for termination. The leading ends 46 are then moved down and crimped to the terminals as shown in FIG. 2E, and the carrier strip is simultaneously sheared from the terminals. The spreading and compensation are then reversed and the terminated wires are withdrawn restoring the wires to their original center to center spacing as shown in FIG. 2F. A connector housing 48 is also shown prior to arrival at an insertion station on the first path via a second path normal to the first path. FIG. 2G shows the housing 48 in position at the insertion station. Note that the terminal receiving cavities 49 in the housing 48 have the same center to center spacing as the terminated wires, which permits insertion by moving the terminated leads forward again on the first path as shown in FIG. 2H. The wires thus inserted in the housing are then held stationary thereby, and are cut and scored at a point remote therefrom, as shown in FIG. 2I. The wires are then pulled from the surrounding insulation bits at the score lines to leave stripped ends as shown in FIG. 2J.

THE SHUTTLE

Figure 3A:
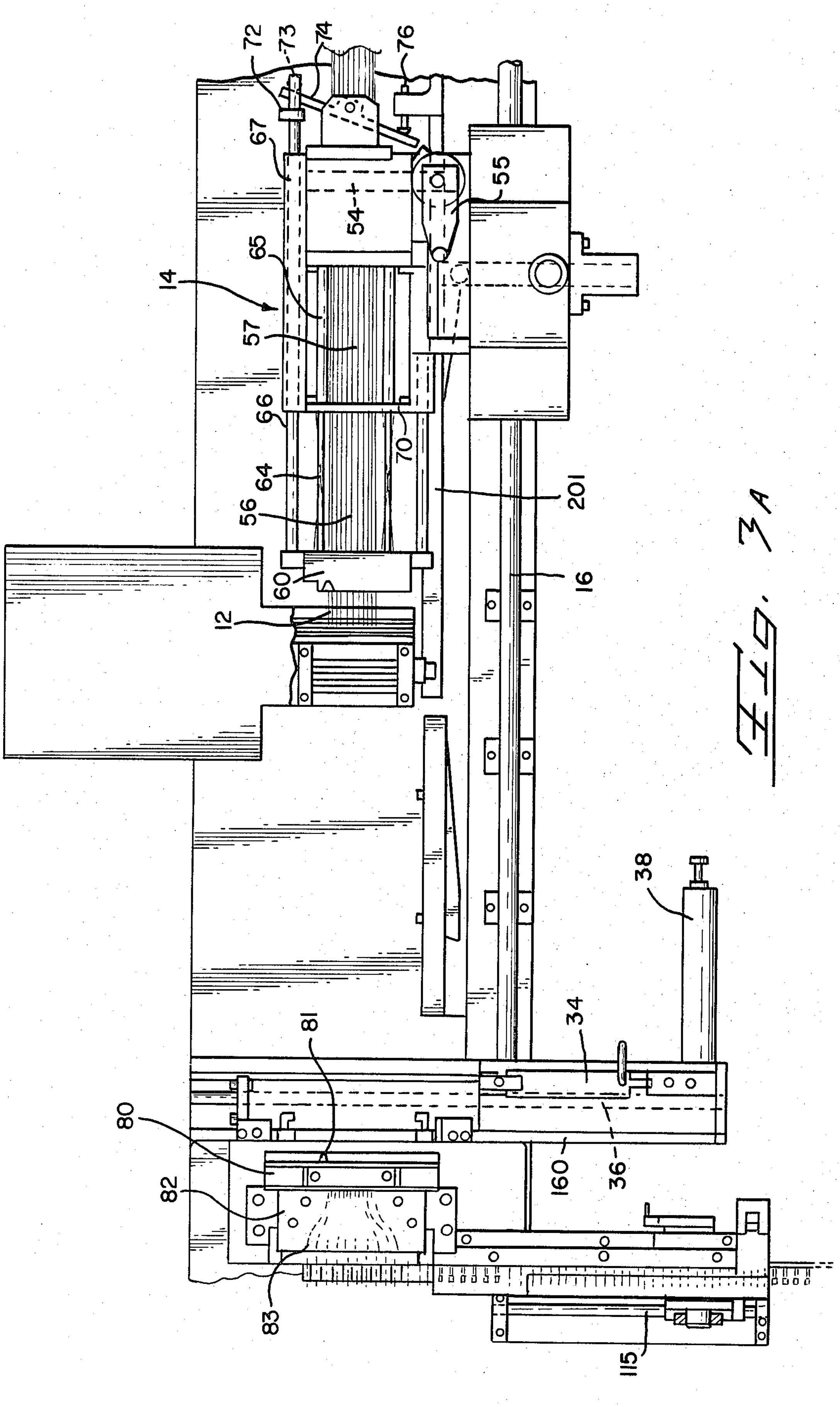
FIG. 3A is a plan view of the apparatus at rest.

The shuttle 14 will now be described in conjunction with FIGS. 3A, 3B, and 3C. Shuttle 14 is a telescoping device comprised of inner or forward wire guide tubes 56 which slide into respective outer or rear wire guide tubes 57. The inner wire guide tubes 56 lie in a planar array and are flanked on either side by an inner spring tube 64 while the outer wire guide tubes are flanked on either side by an outer spring tube 65. The spring tubes 64, 65 are likewise flanked by inner and outer frame tubes 66, 67. All inner tubes 56, 64, 66 are connected to a header 60 at the forward end of the shuttle 14 while the outer tubes 57, 65, 67 are mounted at their forward ends in a cross member 70 in which the inner tubes are slideably mounted for reception in the outer tubes. The inner spring tubes 64 are surrounded by springs (shown in FIG. 6) which bear against the header 60 and cross member 70. The header has ports 62 (not visible) in the forward face thereof which are aligned with the wire guide tubes 56, 57. The rear end of the shuttle has a clamp 54 mounted therein which is controlled by a clamp handle 55 which cams the clamp down onto wires in the shuttle. One of the inner frame tubes 66 extends through its outer frame tube 67 and has a stop collar 72 mounted thereon and a pin 73 mounted vertically therethrough at its end. A lever 74 is pivotably mounted to the shuttle 14 so that it clears the collar 72 mounted on the frame tube 66 but can bear against pin 73. A stop screw 76 fixedly mounted with respect to a rail 201 is positioned to bear against the opposite end of lever 74. The rail 201 is movable with respect to rail 16, and is arranged to bear against the shuttle carriage 15 to shift the entire shuttle 14 backwards during the wire stripping operation, as will be described later.

The operation of the shuttle 14 will now be described. FIG. 3A depicts the shuttle in its fully retracted position with leading ends of wires 12 protruding from the header 60. The wires are clamped so their position is stationary in the outer guide tubes 57. As the carriage 15 advances from the position of FIG. 3A, the lever 74 pivots from its position against stop screw 76 and the springs surrounding inner spring tubes 64 urge the header 60 away from the cross member 70 until the stop collar 72 surrounding the inner frame tube 66 bears against the rear end of the outer frame tube 67. The header 60 thus moves forward relative to the cross member 70 until the leading ends of the wires are inside the header. The shuttle 14 advances until it reaches compensator 80. The header is aligned thereagainst by notch 61 in the header 60 which mates with a profiled post 81 on the face of the compensator. Continued forward movement of the shuttle causes the wires 12 to be extruded from the header 60 as the inner guide tubes 56 telescope into the outer guide tubes 57.

Figure 3B:
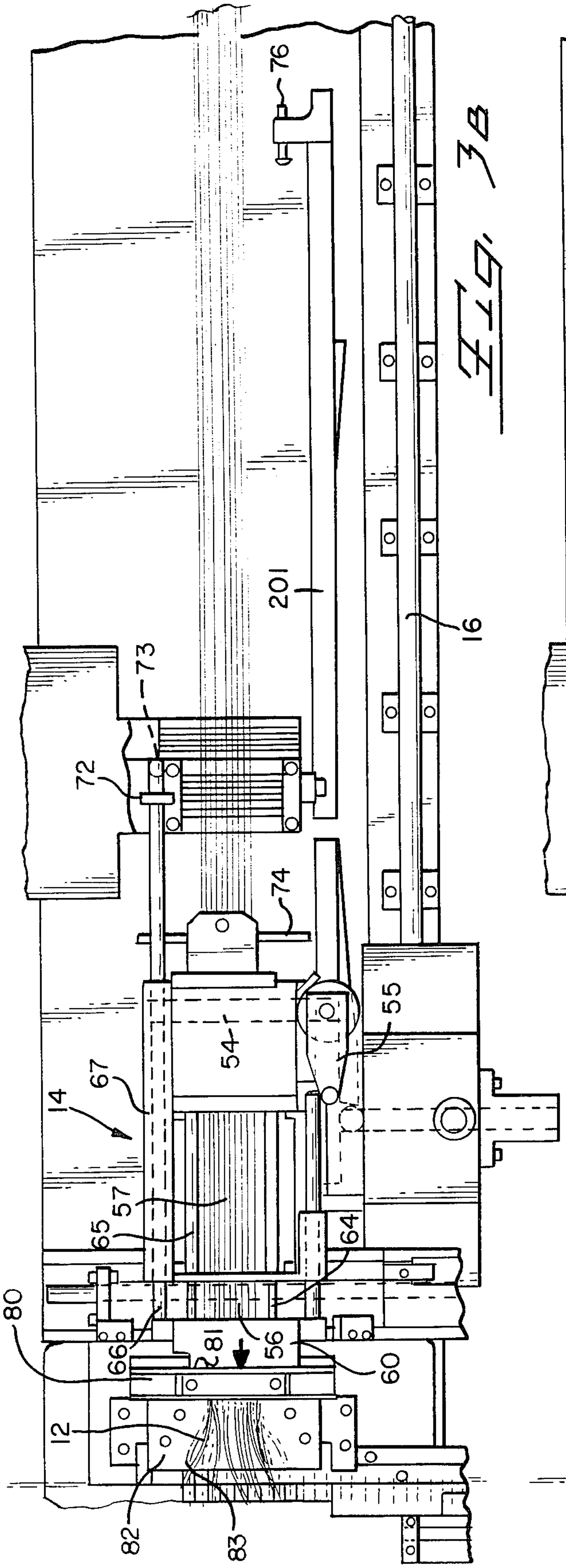
FIG. 3B is a plan view of the apparatus during termination.

FIG. 3B depicts the shuttle fully advanced with the wires fully extruded from the header through the compensator 80 and positioned over the template 82. Note that lever 74 has rotated to a neutral position clear of the stop collar 72. The terminating and inserting operations which then follow will be described under "Operating Zone".

Figure 3C:
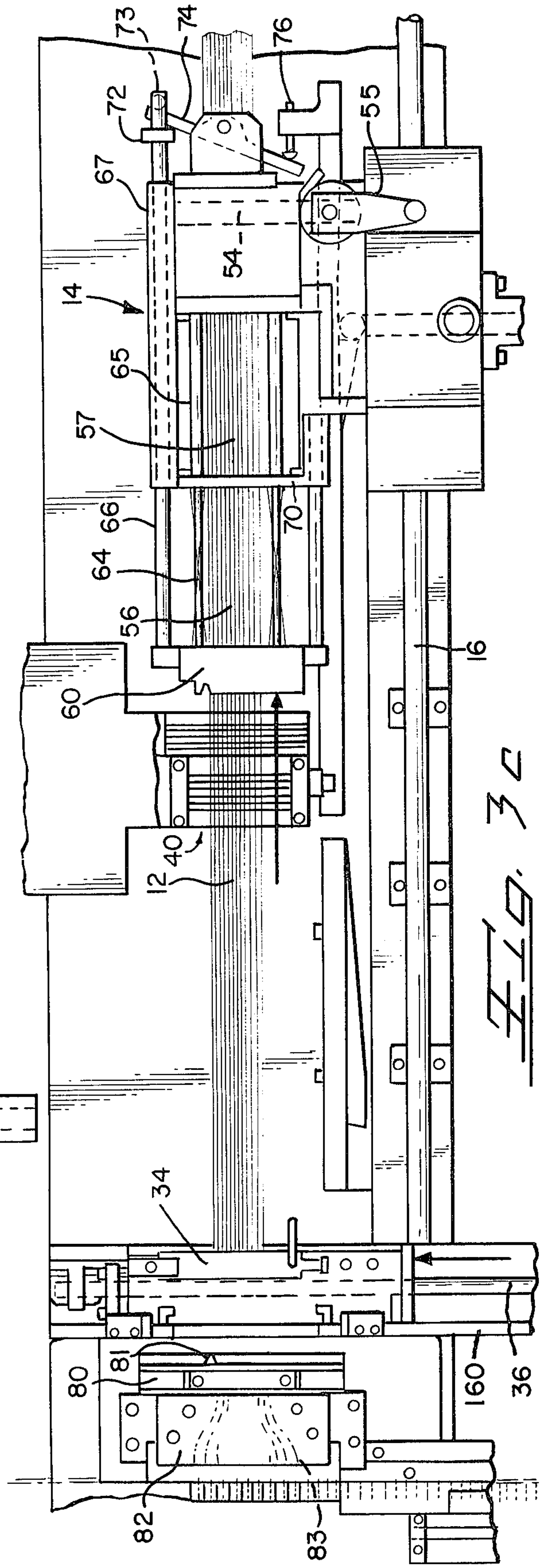
FIG. 3C is a plan view of the apparatus during cutting and stripping.

FIG. 3C depicts the shuttle after the wires 12 are inserted into a connector housing held by clamp 34 and the shuttle has retracted until it clears the strip and shear station 40 through which it passes. The clamp handle 55 is in the open position as the clamp 54 has been released so the wires may be held fixed by the connector housing as the shuttle retracts and the wires pass through the wire guide tubes 56, 57. The wires are then clamped again by clamp 54 so insulation stripping may be performed, as will be described under "Strip and Shear".

OPERATING ZONE

Figure 4:
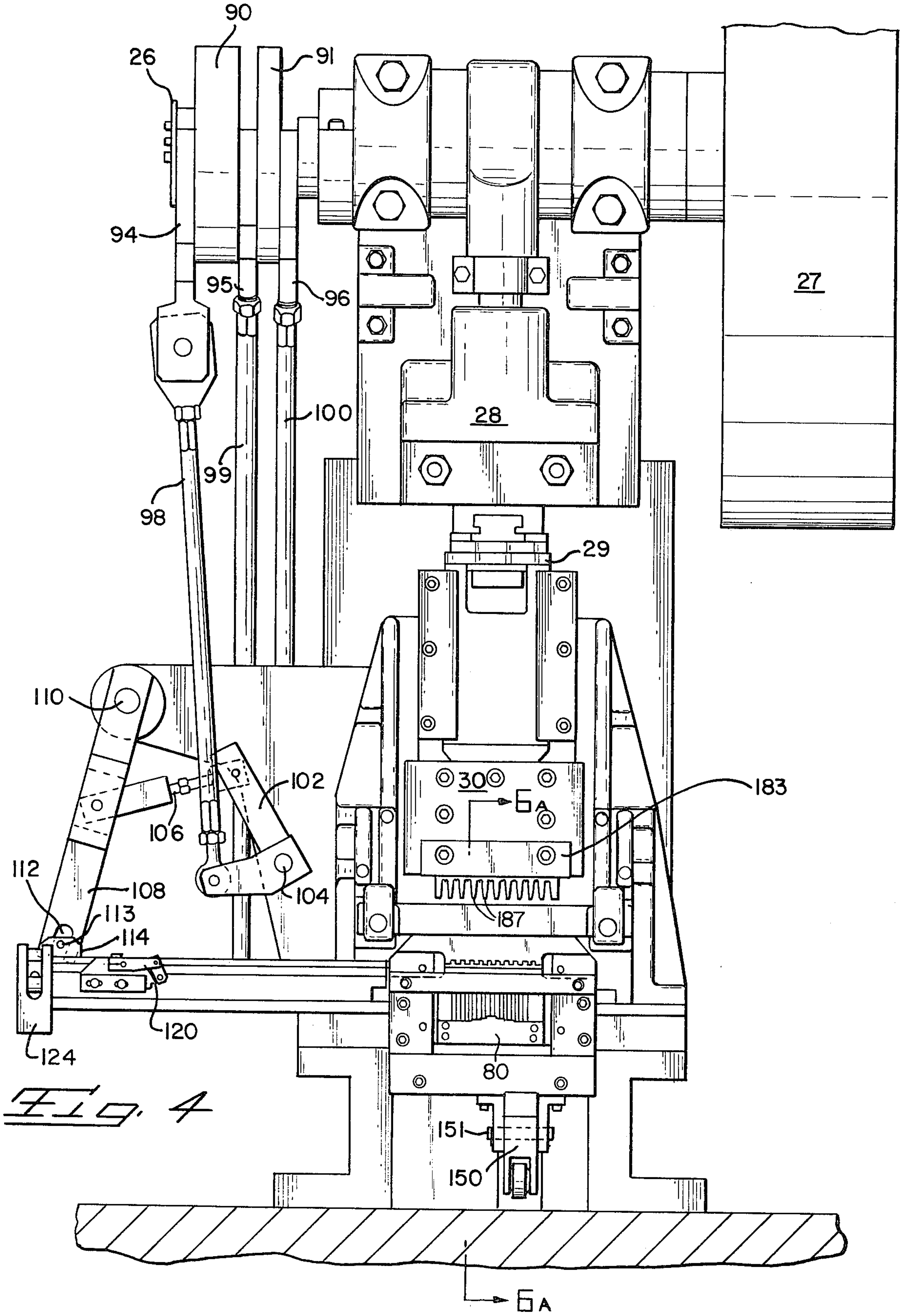
FIG. 4 is a front view of the termination station and terminating linkage prior to terminal feed or wire feed.

The operating zone contains the tooling which performs the operations of compensation, wire spreading, and termination. All of these operations are effected by tooling which is linked to the drive shaft 26. FIG. 4 is a front view of the apparatus which shows the operating zone, ram 28, applicator 30, compensator 80, terminal feed linkage, and part of the linkage for wire spreading and compensation. Barrel cam 90 has a slot in one flat surface thereof which controls the motion of terminal feed follower 94 and a slot in the opposed flat surface which controls the motion of the wire spreading follower 95. Barrel cam 91 has a slot therein which controls the motion of wire compensating follower 96. The followers 94, 95, 96 are connected to respective connecting rods 98, 99, 100 which reciprocate as the drive shaft 26 rotates. The terminal feed connecting rod 98 causes bell crank 102 to oscillate about pivot 104 and act on link 106 which causes arm 108 to reciprocably drive the terminal feed carriage 114. Arm 108 pendulums about pivot 110 and imparts a linear motion to carriage 114 by means of a slot 112 in the arm 108 which acts on a follower 113 fixed to the carriage 114. The carriage 114 feeds the terminal strip (not visible) to the terminating station. Also visible in FIG. 4 and a drag mechanism 124 and anti-back mechanism 120, which will be described in greater detail in conjunction with FIGS. 10A and 10B.

Figure 5:
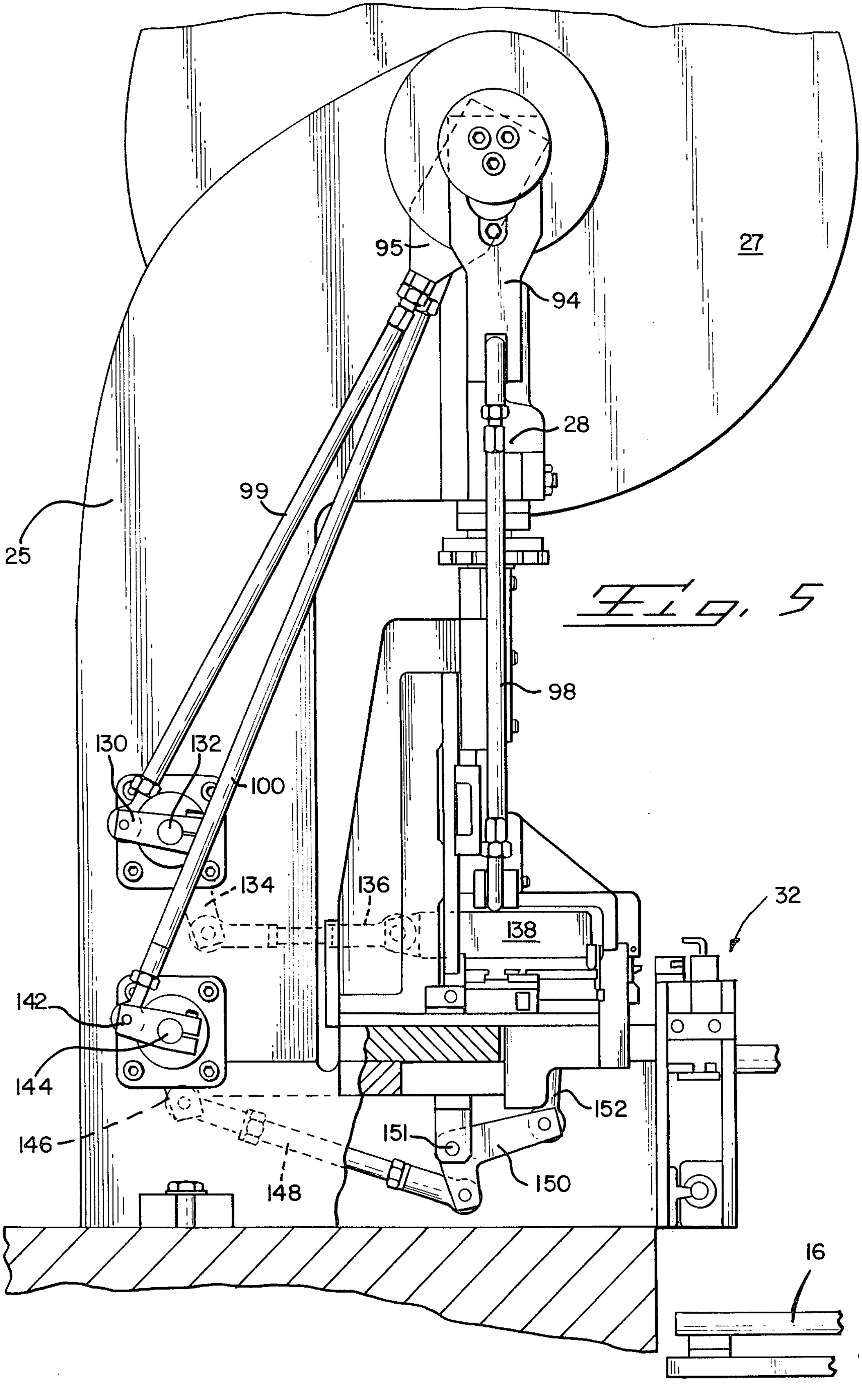
FIG. 5 is a side view of the terminating station and linkage corresponding to FIG. 4.

FIG. 5 is a side view detailing the linkages for wire spreading and compensating. Wire spreading connecting rod 99 imparts a linear motion to wiper carriage 138 by means of cranks 130 and 134 mounted on oscillatory jackshaft 132 which reciprocably drive link 136 which is connected to carriage 138. Wire compensating connecting rod 100 acts on link 148 through cranks 142 and 146 mounted on oscillatory jackshaft 144; link 148 acts on link 152 through bell crank 150 which pivots about pivot 151. Link 152 actuates compensator 80 as will be described in detail in conjunction with FIGS. 6A—6G.

Figure 6:
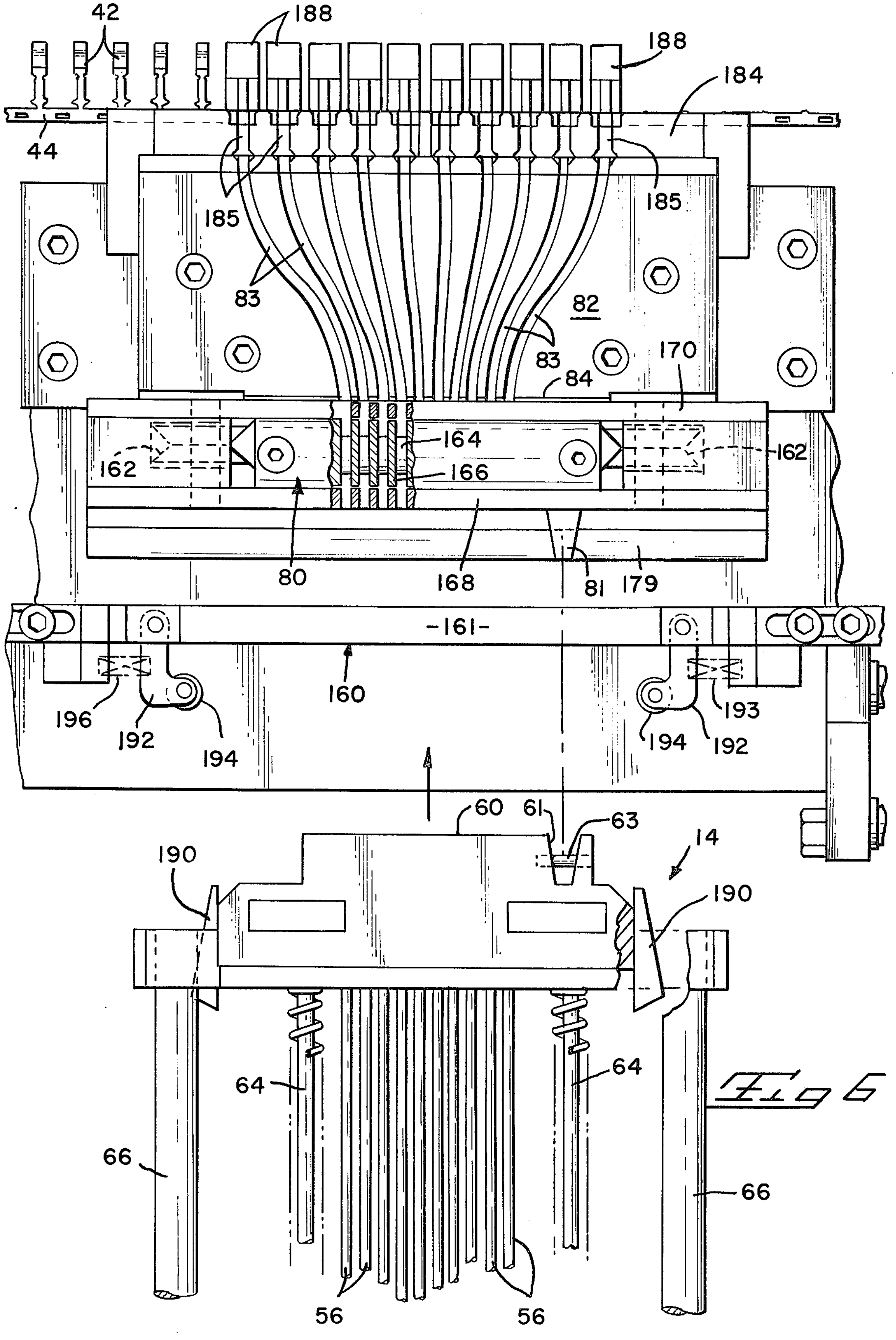
FIG. 6 is a plan view of the termination station as the shuttle and wire manifold approach.

FIG. 6 depicts the leading end of shuttle 14 as it approaches the operating zone and the wall 160 in front of the compensator 60. The wall has an entry 161 therein which accepts the header 60 and latches 192 which cooperate with ramps 190 to hold the header in place when notch 61 mates with post 81. The latches have wheels 194 to minimize latching resistance and springs 193 to urge the latches over the ends of ramps 190.

The compensator 80 rides vertically between upper front plate 168 and upper rear plate 170 in which guide wheels 162 are mounted. The cutaway section of the compensator top member 173 and lifter 174 thereon in FIG. 6 shows the spacers 166 and blades 164 which align with serrate openings in the lower edges of upper plates 168, 170.

The guide template 82 lies adjacent the compensator 80 and has groove 83 therein with first portions aligned with the compensator blades 164 and the serrate openings in plates 168, 170. The grooves 83 diverge to second portions thereof which align with profiled notches 185 in shear 184. The notches 185 in turn are aligned with anvils 188 on which the leading ends of wires are terminated.

Figure 6A:
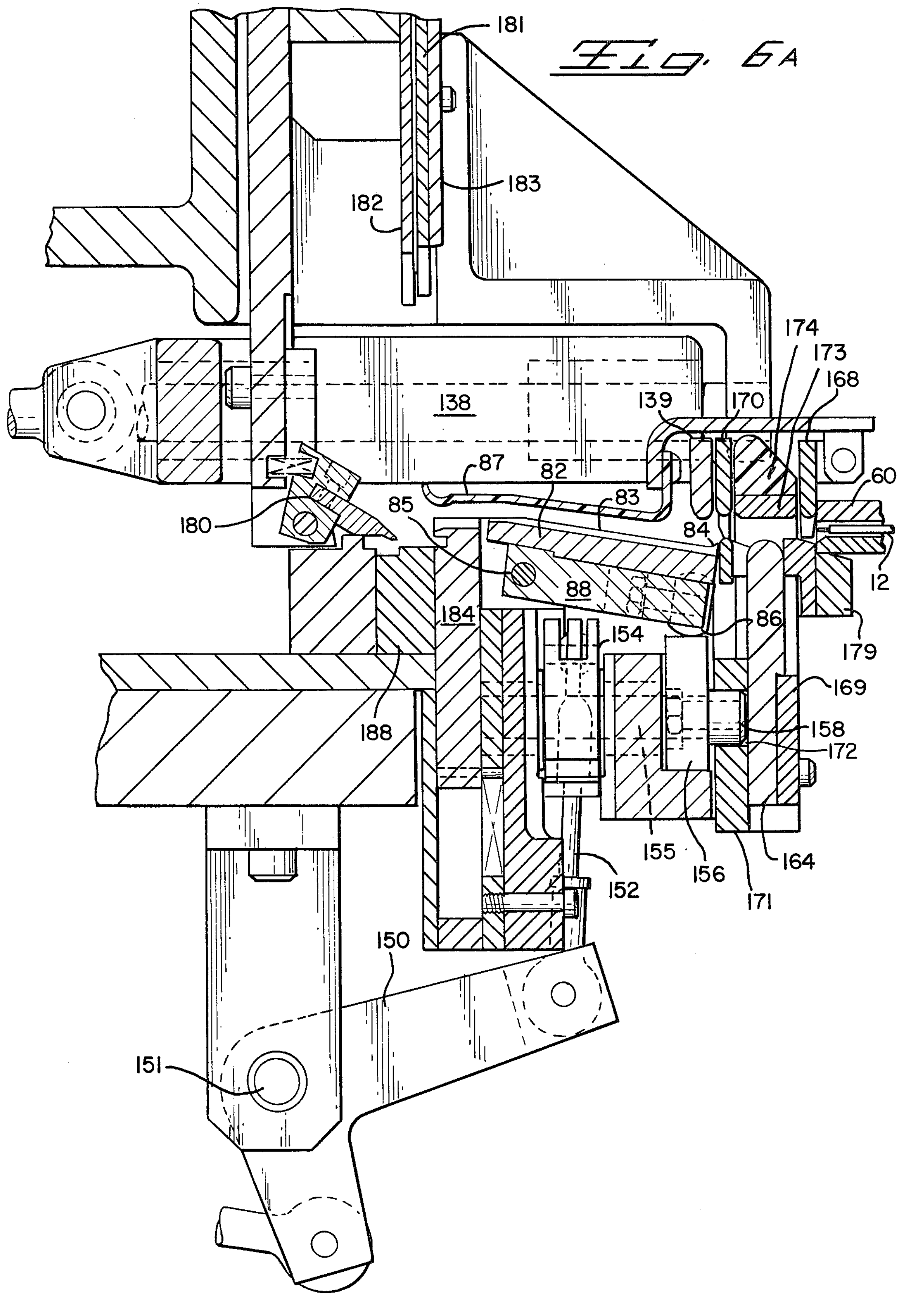
FIG. 6A is a side cross section taken along line 6A—6A of FIG. 4 showing the terminating station with the shuttle forward, immediately prior to wire feed.

FIGS. 6A thru 6G show the operations of compensation, wire spreading, and termination, which will now be described in detail. Referring first to FIG. 6A, link 152 oscillates under the action of bell crank 150 as previously described and is pivotably attached to crank 154 which is fixedly attached to shaft 155. The shaft 155 carries a cam 156 and a follower 158. The cam 156 bears on follower 86 which is borne by template mounting block 88 which carries template 82 and pivots about pivot 85. This cross section of the template is taken through a groove 83 and shows the raised edge 84 adjacent to upper rear compensator plate 170. Follower 158 rides in cam slot 172 in lower rear compensator plate 171. Compensator blades 164 are borne between lower front and lower rear compensator plates 169 and 171. The spacers 166 are also borne between the lower plates 169 and 171 and fit into grooves in top member 173. These features also appear in FIGS. 9A and 9B.

Figure 6B:
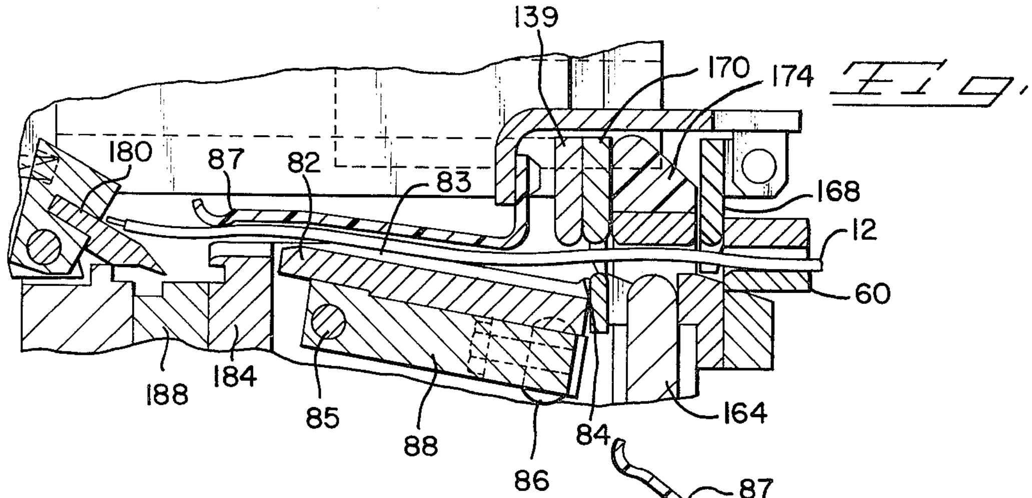
FIG. 6B is similar to FIG. 6A and shows the wires immediately after feed.

FIG. 6B corresponds to FIG. 2B and is similar to FIG. 6A but shows the wires as they are extruded from the header 60 and into the operating zone under the forward movement of the shuttle previously described. Wires are trapped between the template 82 and lid 87 but are not aligned in the grooves 83.

Figure 6C:
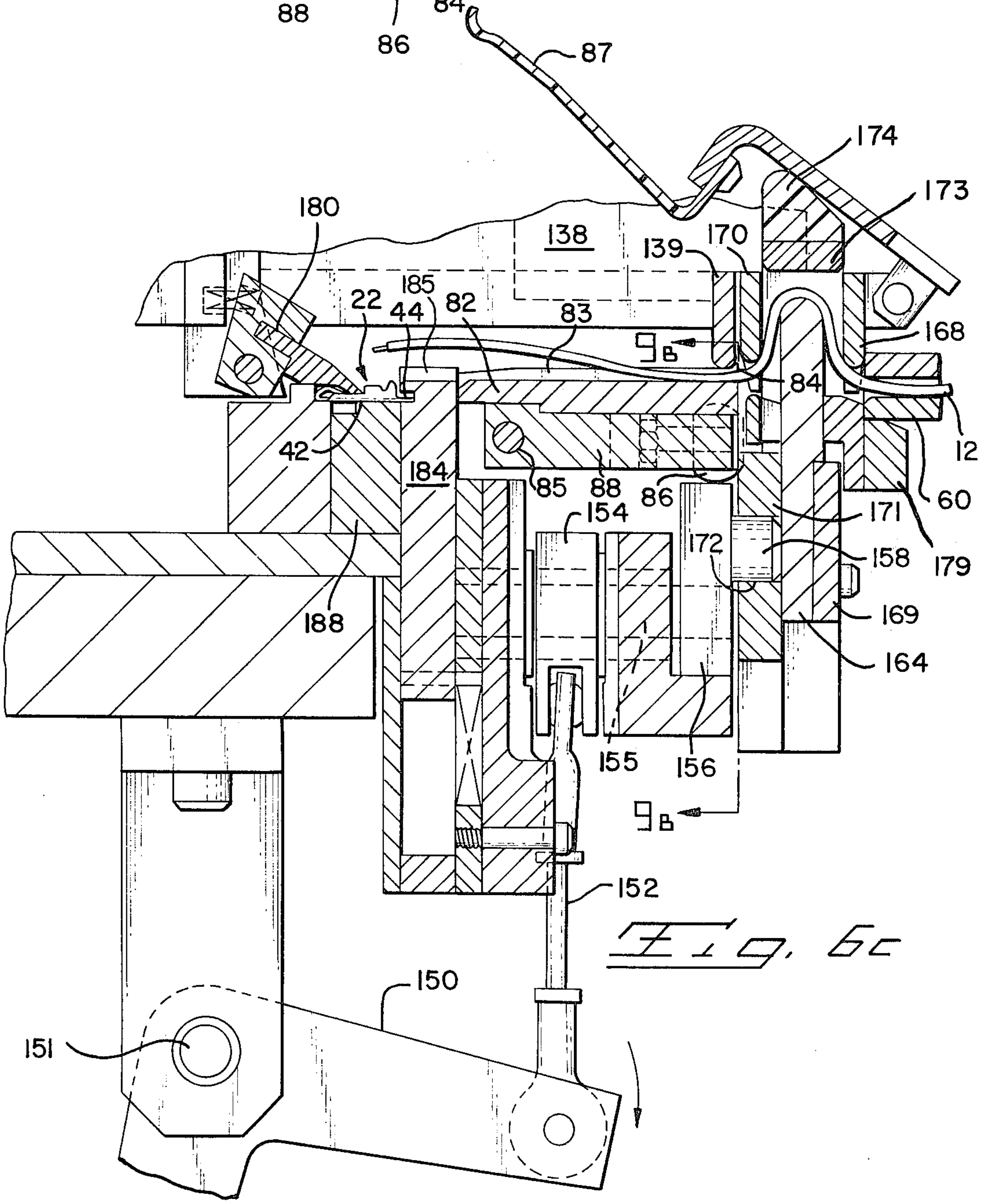
FIG. 6C is similar to 6B, after terminals are fed wire is compensated, and template is moved up to trap wires.

FIG. 6C corresponds to FIG. 2C. Here downward movement of the link 152 effects upward movement of the template 82 and compensator blades 164 by the action of cam 156 and follower 158. Note that plates 169, 171 move with the compensator blades 164, which pass upward through plates 168, 170 which are stationary. The compensator blade shown in section here is the longest and thus imparts the greatest deflection to the wire, which is trapped in the serrate openings in the lower edges of upper plates 168, 170. The wire is further trapped in the grooves 83 between the raised edge 84 of the template 82 and wiper 139 which is carried by wiper carriage 138. The lid 87 is pivoted upward by the action of the compensator lifter 174. The terminal feed linkage previously described simultaneously advances the terminal strip 22 so that individual terminals 42 lie on the anvils 188 and the carrier strip 44 lies in shear slot 186. A resiliently mounted terminal clamp 180 holds the terminal strip 22 in position as it is advanced by the carriage 114.

Figure 6D:
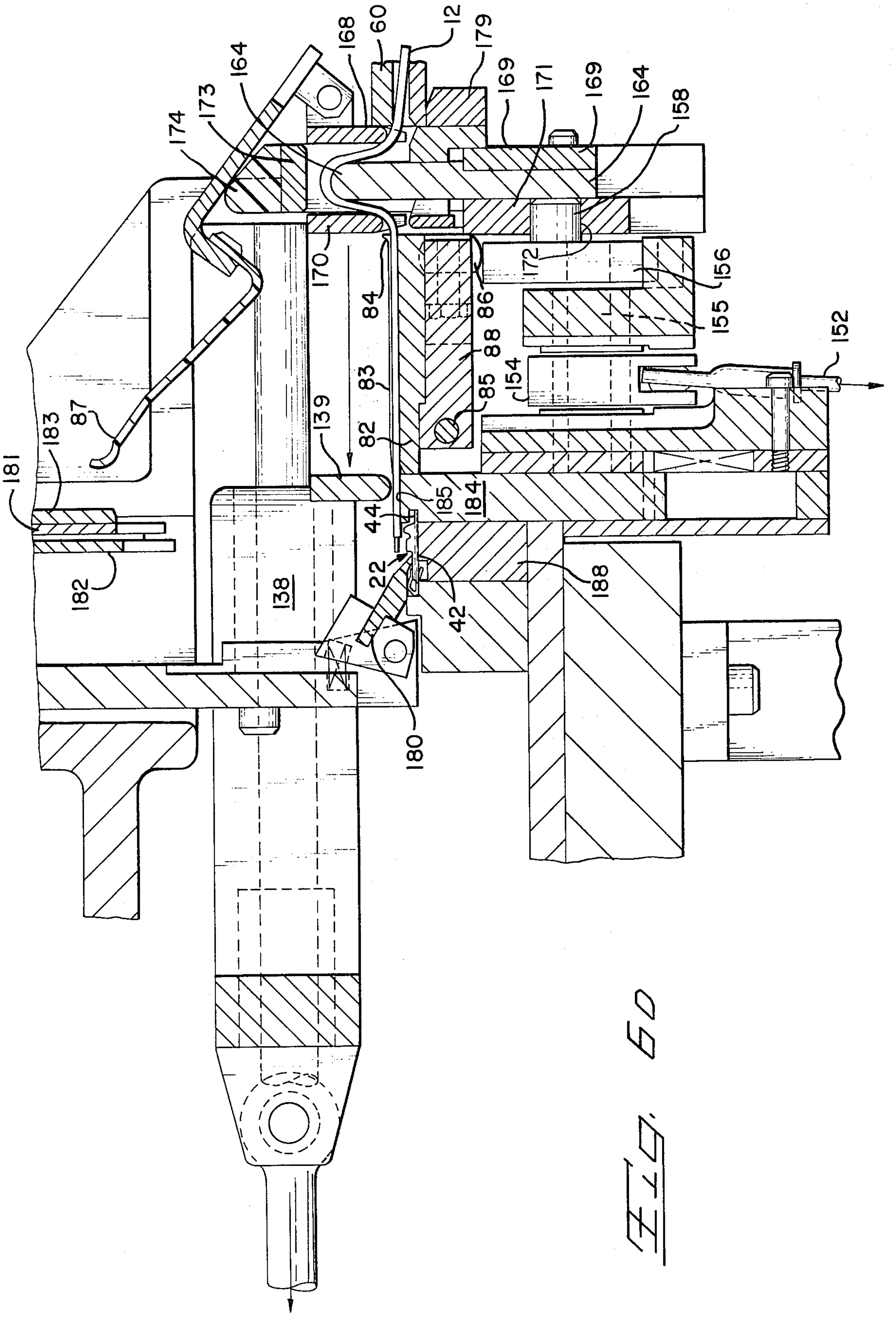
FIG. 6D shows wires after wiping into template.

FIG. 6D corresponds to FIG. 2D and shows the action of the wiper 139 as it wipes the wires into grooves 83 in template 82 and into profiled notches 185 in the top of the shear 184 so that the leading ends of the wires are positioned over the terminals 42. Applicator 30, shown poised over the terminating station, comprises an insulation crimper 181, wire crimper 182, and gripping member 183. Crimpers which act on individual terminals are separated by fingers 187 which appear to best advantage in FIG. 4.

Figure 6E:
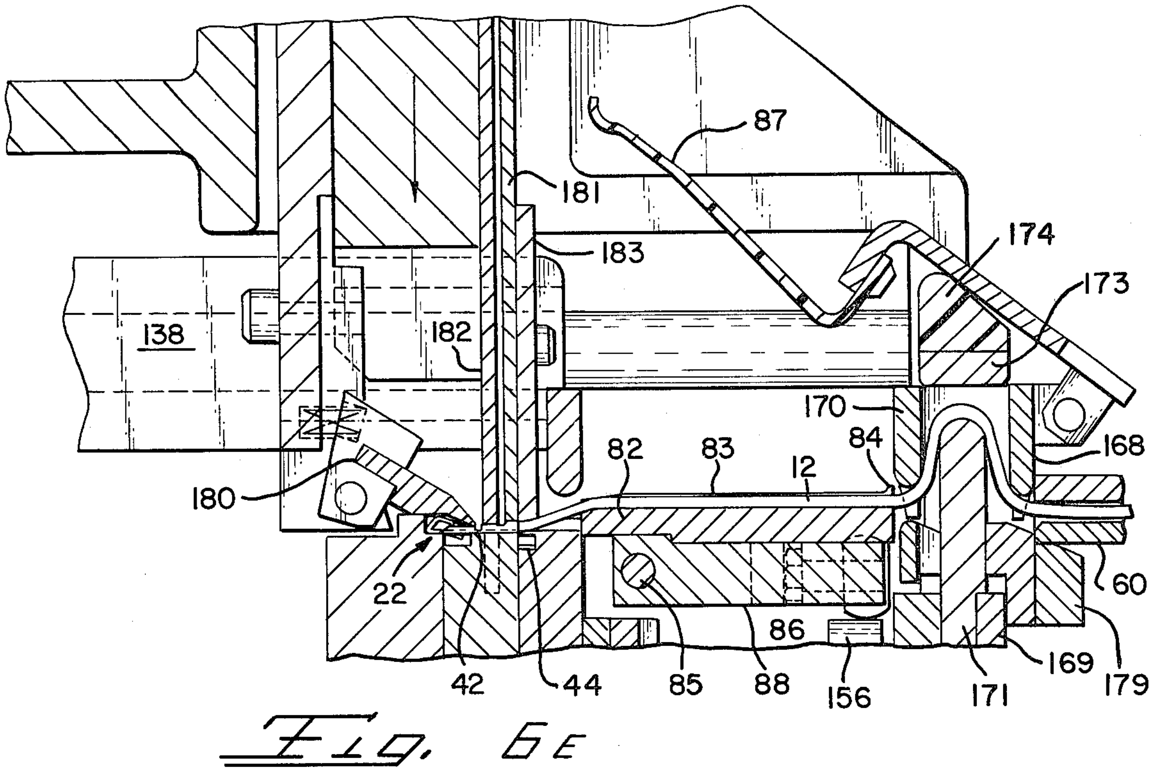
FIG. 6E shows crimping and shearing of terminal from carrier strip.

FIG. 6E corresponds to FIG. 2E and shows the termination of the wire to the terminal as the applicator 30 descends and the crimpers 181, 182 crimp the insulation and wire barrels respectively. The gripping member 183 grips the wires firmly in the profiled notches in the top of the shear 184 while it bears down on the resiliently mounted shear, pressing the carrier strip 44 against the top of the shear slot 186 and severing the connection between the terminals 42 and the strip 44. The fingers separating the crimpers travel between the anvils.

Figure 6F:
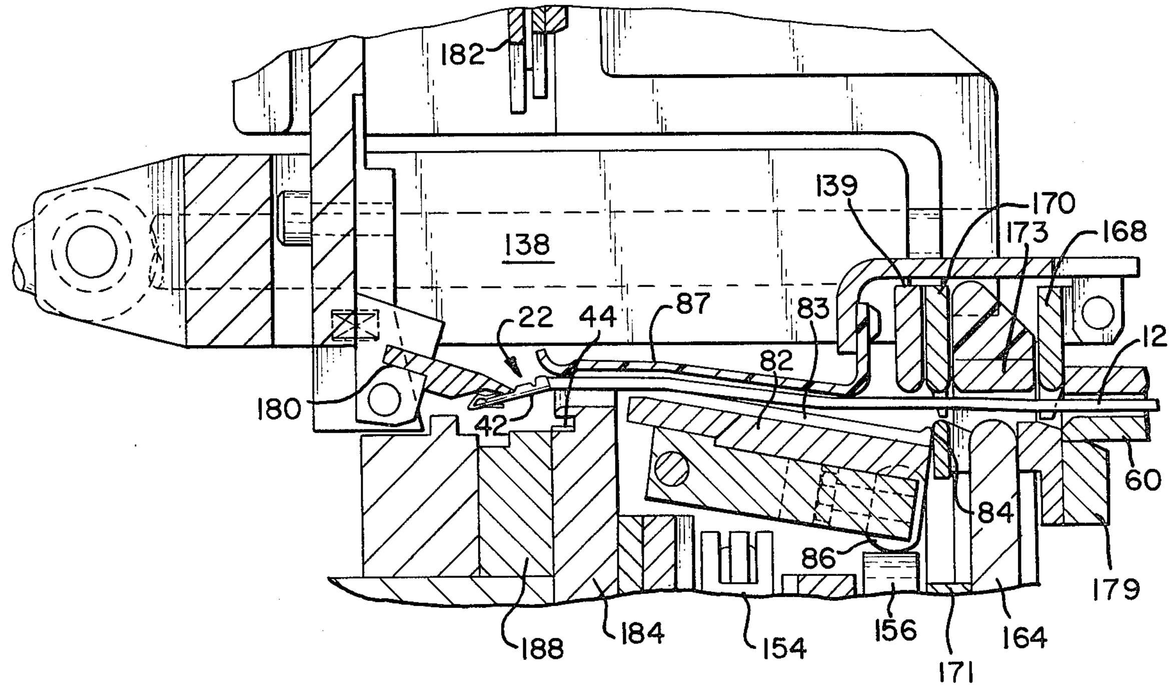
FIG. 6F shows the retraction of tooling for termination.

Referring to FIG. 6F the link 152 (FIG. 6A) has travelled upward again and effected the return of the template and compensator to the position of FIG. 6A. The applicator 30 has returned upward by the continued rotation of the drive shaft, and the terminated ends of the wires spring upward with the shear 184 against the resiliency of the terminal clamp 180. The wiper 139 has returned, and the lid 87 has fallen as the compensator 80 descended.

FIG. 6G depicts the withdrawal of the terminated wire from the operating zone into the header 60 under the action of the retreating shuttle.

Figure 8:
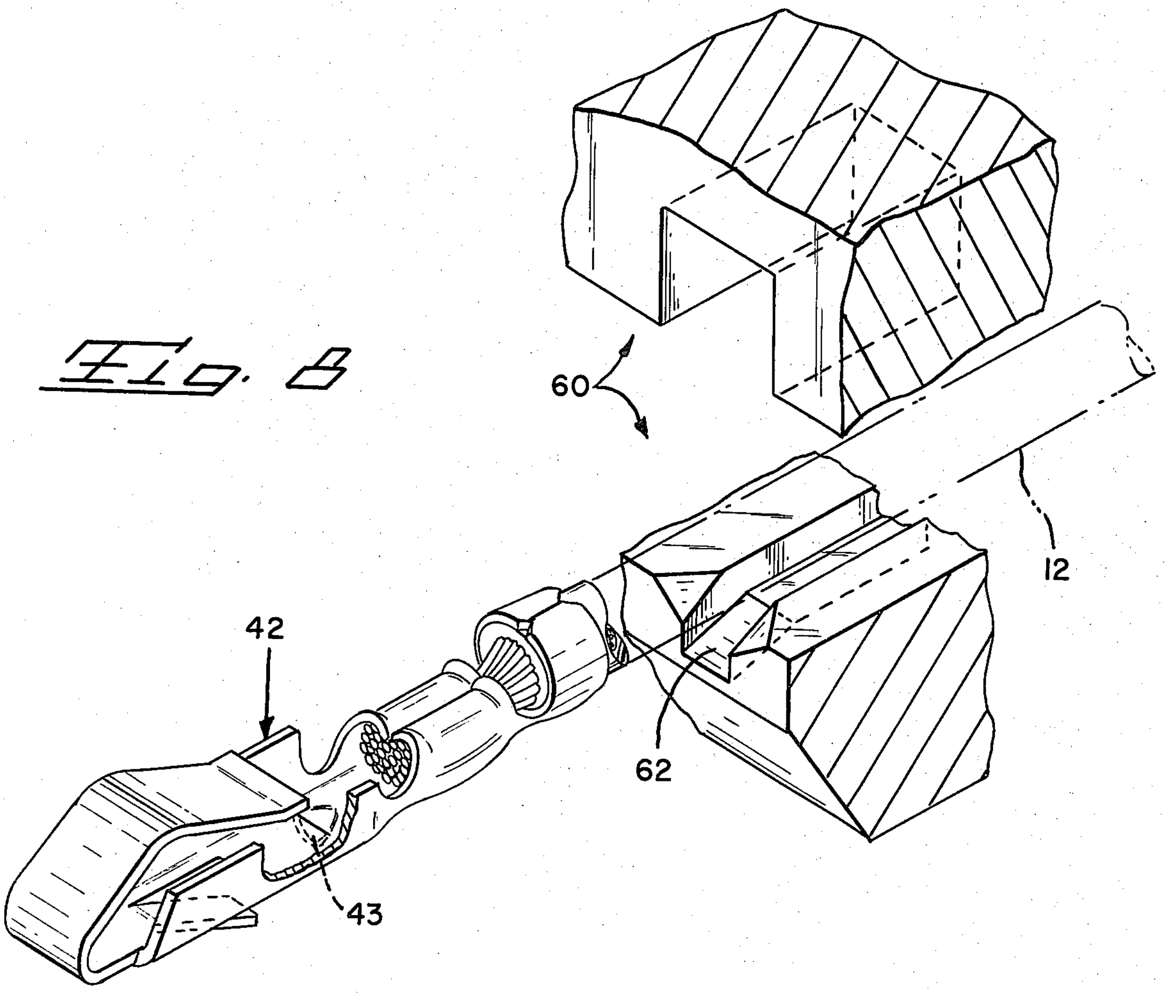
FIG. 8 is an enlarged fragmentary perspective of a part in the header showing terminal orientation features.

FIG. 7A details the terminating station immediately prior to termination. The gripping member 183 has just met the wire 12 in the profiled notch 185 in the top of the shear 184 and holds it firmly therein preventing rotation of the wire during termination. FIG. 7B shows the terminating operation as the crimpers 181, 182 crimp the insulation and wire barrels and the shear is depressed severing the terminal from the carrier strip as the shear slot 186 passes below the top of the anvil 188. FIG. 7C details the notch in the top of the shear 184. FIG. 8 details a terminal as applied to the leading end of a wire, and further details the profile of port 62 in header 60. The header is comprised of two pieces machined as shown. The port has 45 degree bevels so that a tab 43 on the bottom of the terminal will cause it to be aligned in the header as the shuttle retreats and the telescoping tubes expand to draw the terminated leads in the header.

Figure 9A:
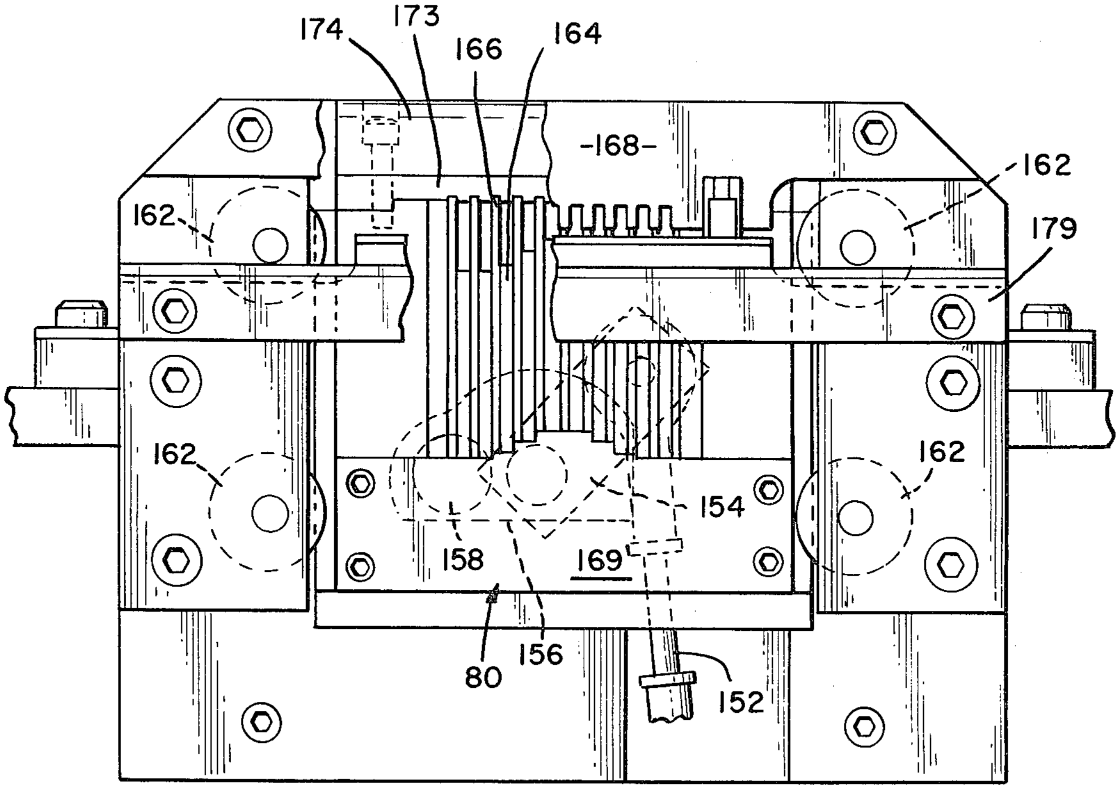
FIG. 9A is a front view of the terminating station showing the compensator tooling package in the down position.

FIG. 9A is a front view of the compensator 80 and corresponds to FIG. 6A. Link 152 is in the raised position so that cam 156 has not yet pivoted up to raise the compensator. The upper front compensator plate 168 and ramp plate 179 are cut away exposing the top member 173 in which the spacers 166 are mounted.

Figure 9B:
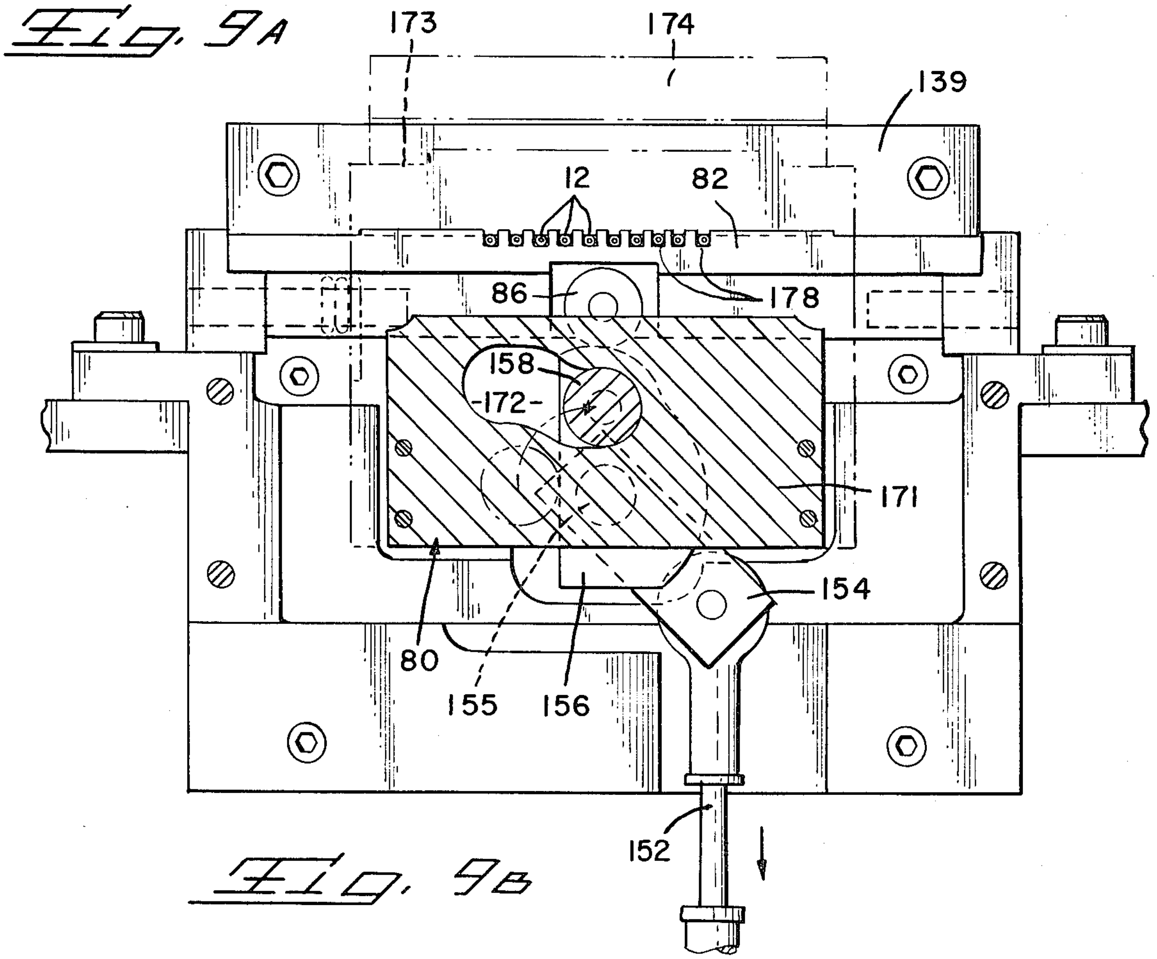
FIG. 9B is a cross section of the compensator tooling taken behind the view of FIG. 9A along line 9—9 of FIG. 6C, showing the cam and lever with the compensator tooling raised.

FIG. 9B is a cross section taken along 9B-9B of FIG. 6C and shows the compensator linkage when the compensator is up with the wires in the operating zone. Follower 158 has lifted the compensator by its motion through cam slot 172 in the rear plate 171 and cam 156 has acted on follower 177 to lift template 82 trapping the wires in grooves 178.

Figures 10A, 10B:
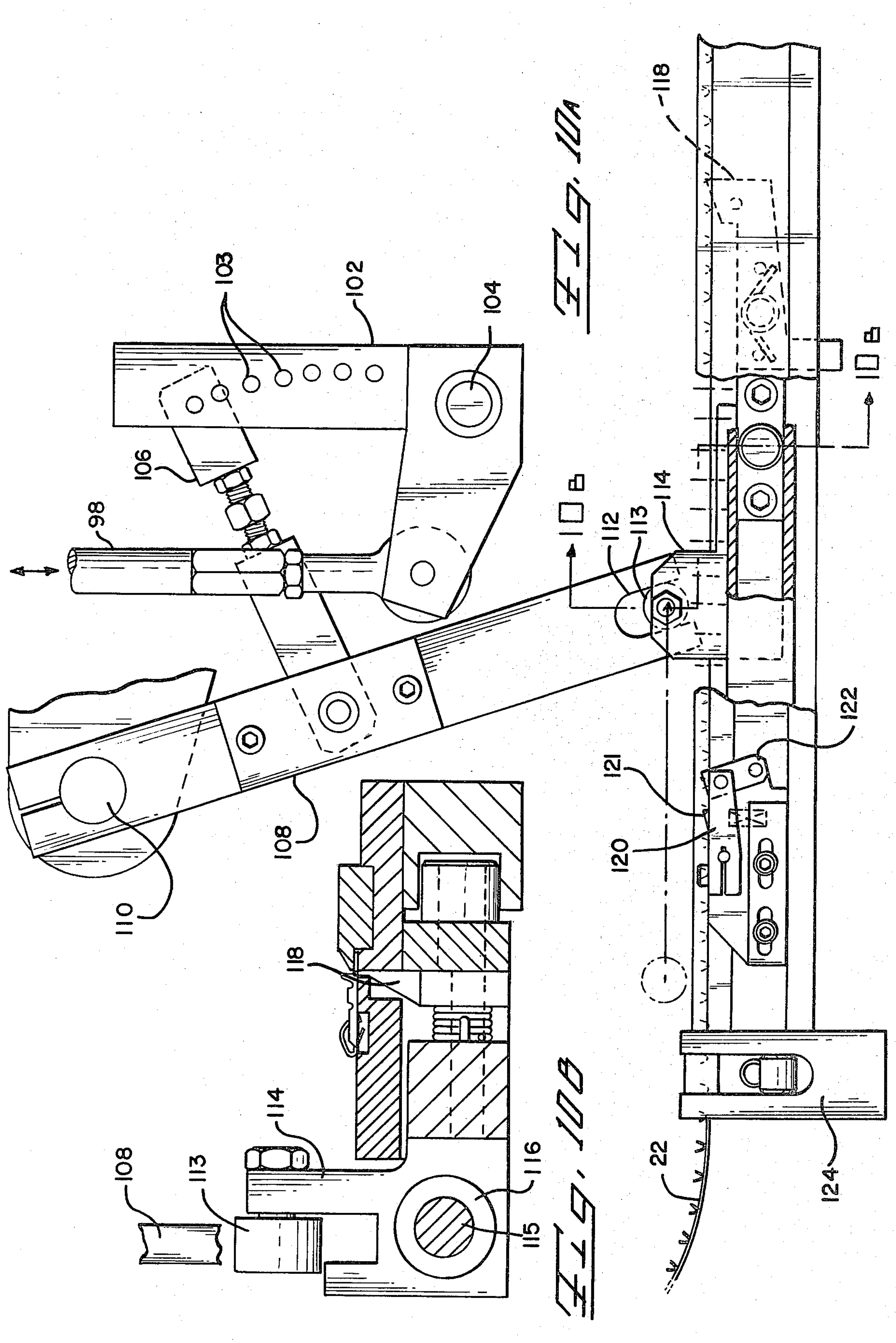
FIG. 10A is a front view of the terminal feed apparatus as the terminals are advanced.
FIG. 10B is a side cross section taken along line 10B—10B of FIG. 10A.

FIG. 10A is a front view of the terminal feed apparatus as the terminals are advanced. The linkage which advances carriage 114 was discussed in conjunction with FIG. 4. Note the holes 103 in bell crank 102 and the threaded rod in link 106 which permit adjustment of the linkage so that the terminals will be precisely placed on the anvils prior to descent of the applicator. The terminal strip 22 is advanced by feed pawl 118 at the leading end of carriage 114. The pawl 118 bears on an individual terminal during advance and springs away from the strip during retreat. The strip is prevented from backing up during the retreat of the carriage by anti-backup mechanism 120, which comprises anti-back-up pawl 121 and a release 122 which pemits withdrawal of the terminal strip 22 from the apparatus. A drag mechanism 124, also on the terminal feed path, assures that the terminal strip 22 will not advance beyond the travel of feed pawl 118. FIG. 10B is a cross section of FIG. 10A and shows the cylindrical rail 115 which determines the linear travel of the carriage 114, which is journaled to the rail by bearing 116.

Figure 13:
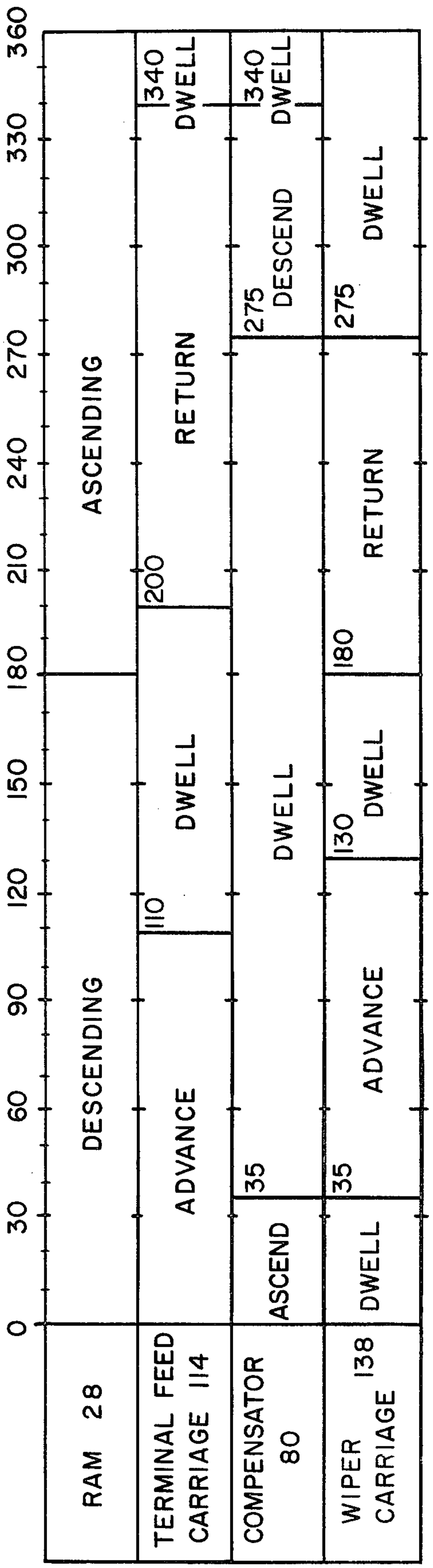

The sequence of the above described steps which occur in the operating zone is described graphically in the timing diagram, FIG. 13.

INSERTION STATION

Figure 11:
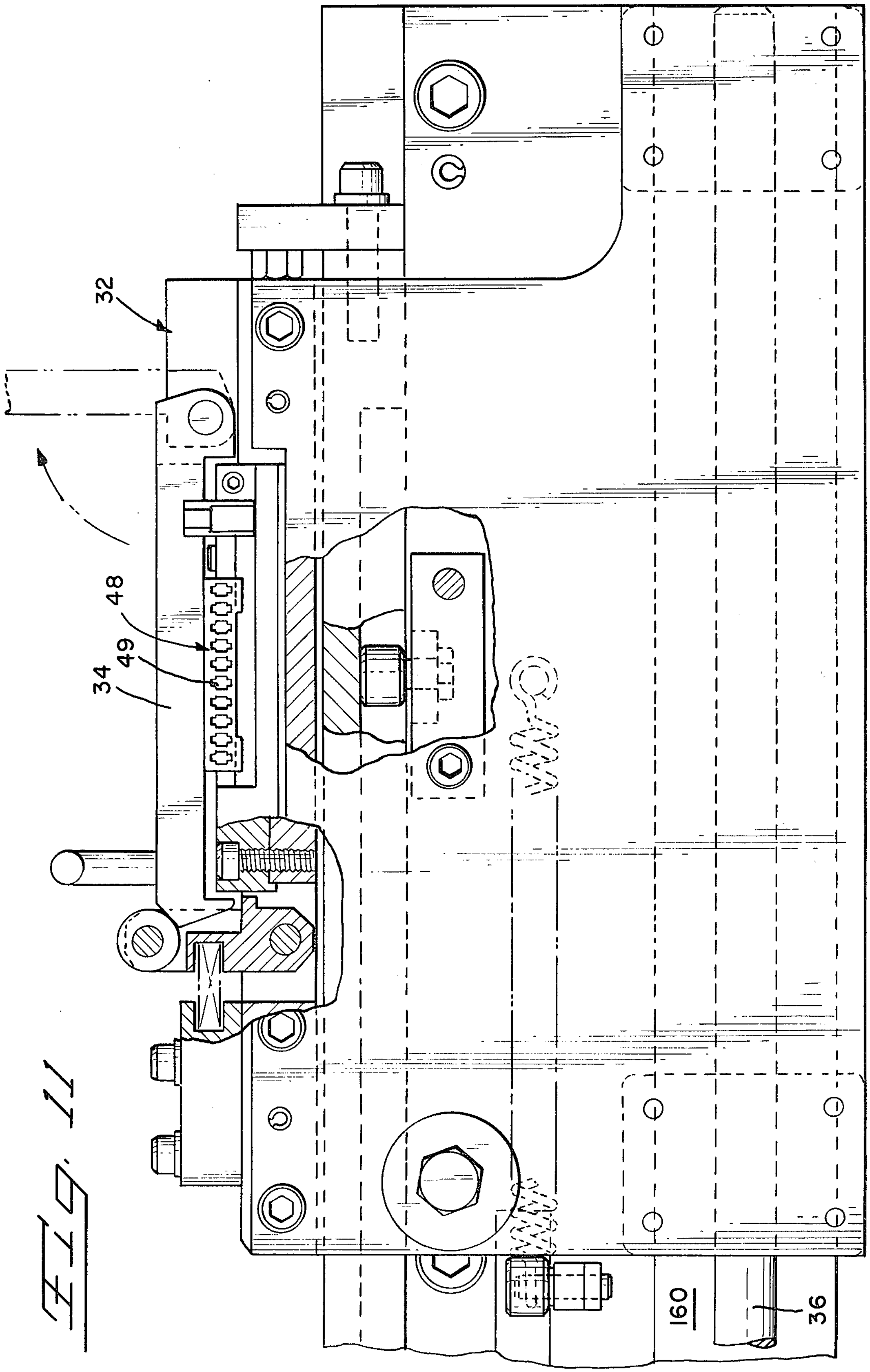
FIG. 11 is a front view of the housing feed as it moves into the path of the wire shuttle with a housing clamped in place.

As discussed in conjunction with FIG. 1, an insertion station is defined by the area on the first linear path where the connector housing is carried on a second linear path for insertion of terminated leads. FIG. 11 details the housing carriage 32. The connector housing 48 is fixed to the carriage 32 by clamp 34 whereby it is held securely at the insertion station. The carriage travels on rail 36 which is fixed to wall 160, which also appears in FIGS. 3A, 3B, and 3C. Once the housing 48 is in place at the insertion station, the shuttle again moves forward until the header abuts the housing and telescoping tubes collapse until the terminated leads are extruded fully into cavities 49. Here the proper radial alignment of the terminals as described in conjunction with FIG. 8 is important, as the terminals 42 will not mate with the cavities 49 unless so aligned.

STRIP AND SHEAR

Figure 12A:
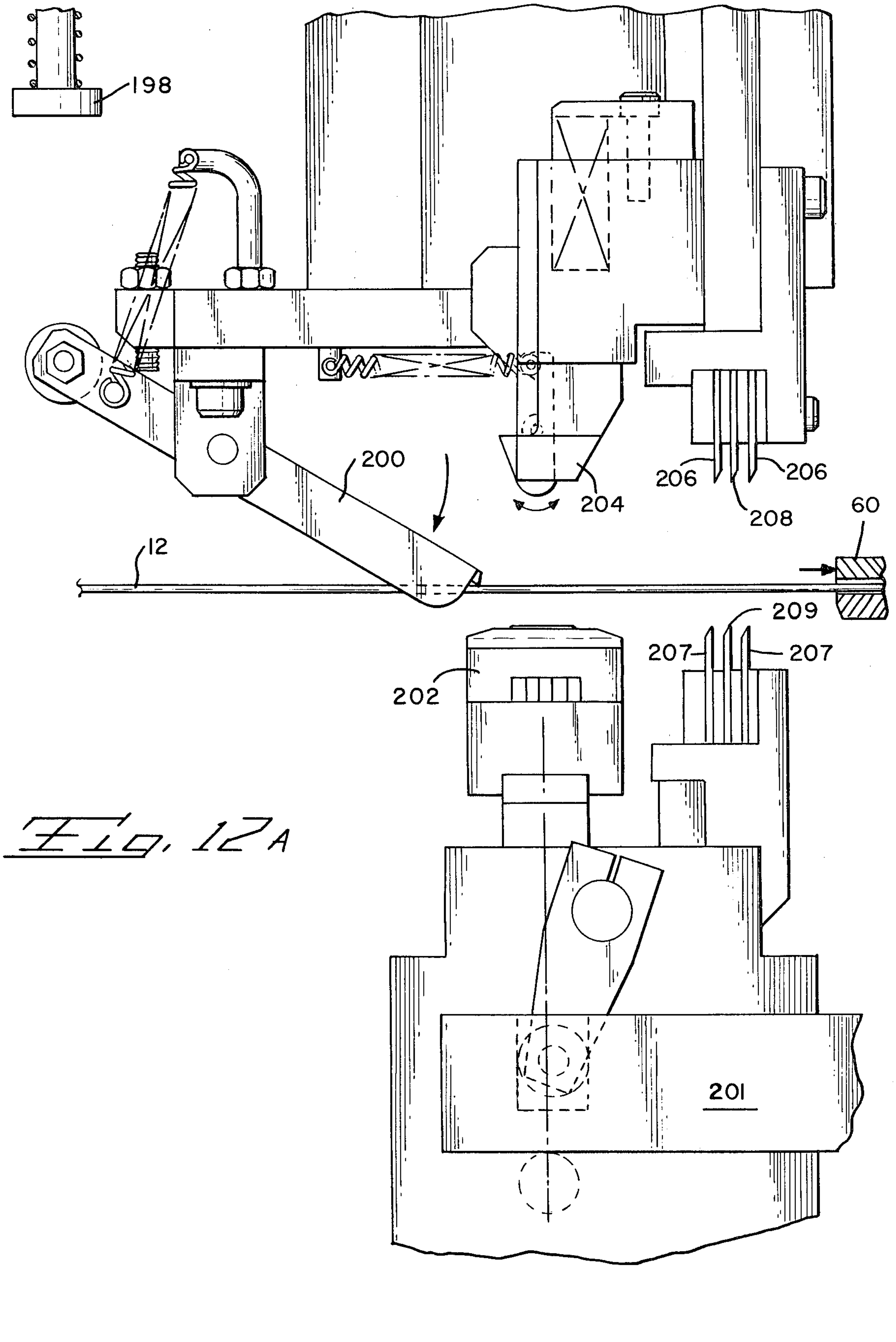
FIG. 12A is a side view of the shearing station as the shuttle returns from inserting wires into the connector housing.
Figure 12B:
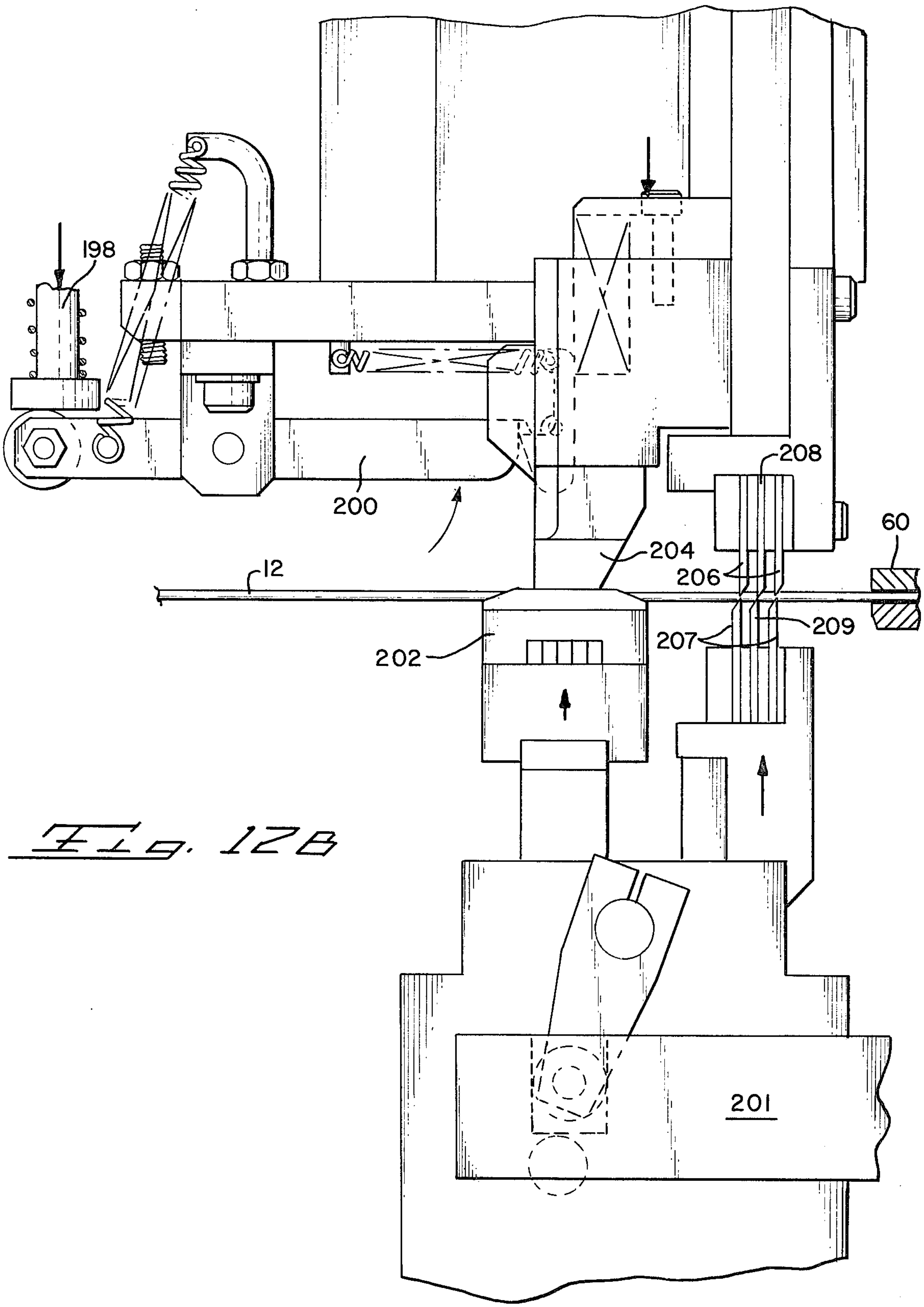
FIG. 12B is a side view of the shearing station as the wire is clamped and the strip and shear blades meet the wire.
Figure 12C:
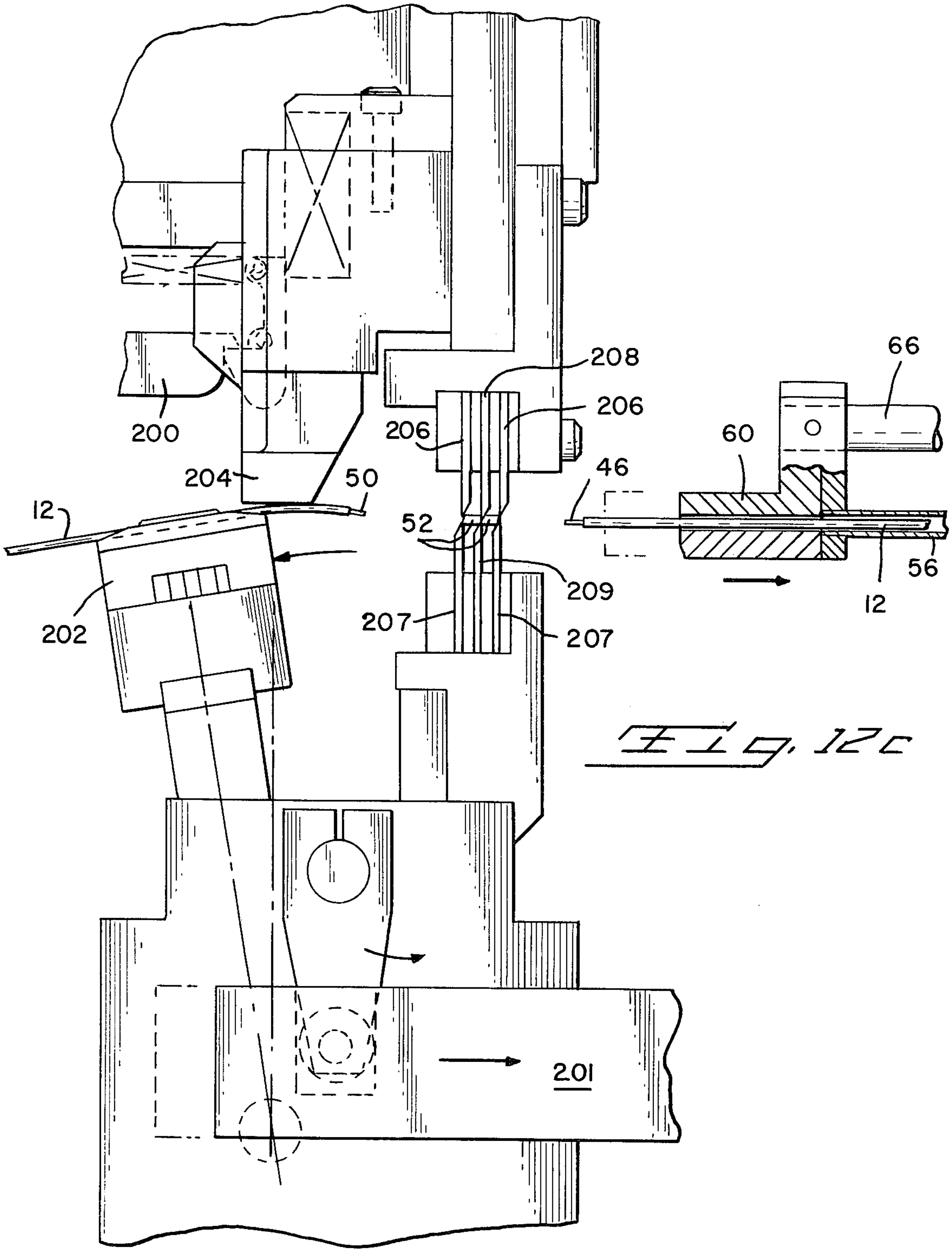
FIG. 12C is a side view of the shearing station as the shuttle and clamp withdraw the severed wire from the blades.

The strip and shear station shown in FIGS. 12A to 12C is defined by the area on the first linear path which lies between upper and lower scoring blades 206, 207 and the upper and lower shear blades 208, 209.

After the terminated leads are inserted in the housing as previously described, clamp 54 (FIG. 3B) on the shuttle is released and the shuttle is retracted over the wires until the header 60 clears the strip and shear station. A grooved lever 200 is tripped as the shuttle passes, whereby the center to center spacing of the wires is maintained at the strip and shear station. The clamp 54 is reapplied when the header is in the position of FIG. 12A.

Once the wires are securely positioned between the lever 200 and the header 60, a clamp 202 with jaws in its surface rises to meet the wires while an opposed tamper 204 descends to tamp the wires into the jaws. The scoring blades 206, 207 come together to cut only the insulation on either side of the shear blades 208, 209, which come together to completely shear the wires. An actuator 198 then descends to pivot lever 200 out of the first linear path to the position of FIG. 12B.

A movable rail 201 is then shifted as shown in FIG. 12C. The rail bears on shuttle carriage 15 to pull the leading ends 46 of a new set of wires from the strip and shear station. Jawed clamp 202 is pivoted as shown to pull the trailing ends 50 of the terminated wires from the strip and shear station.

The foregoing description is directed to but one embodiment of the invention and modifications may be made thereto without departing from the scope of the invention. For example, different templates could be used for different wire spacing, or other profiles could be used for the ports in the header for radial orientation of other types of terminals. The actual scope of the invention is intended to be defined in the following claims when viewed in their proper perspective against the prior art.

What is claimed is:

1. Apparatus for terminating the leading ends of a plurality of wires to a like plurality of terminals comprises:

an operating zone having a terminating station therein;

a wire delivery shuttle which is reciprocable on a first path from said operating zone to a point remote therefrom, said shuttle having a leading end closest to said operating zone, said shuttle having a like plurality of elongated wire guide tubes in a planar parallel array, said guide tubes having a first fixed spacing, each guide tube having two telescoping parts, the innermost part extending to the leading end of the shuttle, each guide tube closely accommodating a single wire, said shuttle having releaseable wire gripping means effective to hold the wires stationary with respect to the outermost of the telescoping parts, whereby, said shuttle may reciprocate on said path toward and away from said operating zone and deliver said leading ends of said wires to said operating zone in a planar array at said first fixed spacing, said leading ends being extruded from the guide tubes into the operating zone for termination by stopping the leading end of the shuttle at the operating zone and collapsing the telescoping parts by continued movement of the shuttle while the wire gripping means hold the wires stationary with respect to the outermost of the telescoping parts.

2. The apparatus of claim 1 wherein said operating zone has wire spreading means therein aligned with said path and adjacent to said terminating station, whereby, said shuttle may deliver said wires to said terminating station at a second fixed spacing.

3. The apparatus of claim 2 wherein said wire spreading means comprises a planar guide template having a plurality of grooves therein, said grooves having first portions spaced at said first fixed spacing remote from said terminating station and second portions spaced at said second fixed spacing adjacent to said terminating station, said spreading means further comprising a wiper assembly which wipes the wires into the grooves from the first portions toward the second portions.

4. The apparatus of claim 3 wherein said operating zone has wire deflecting means adjacent said guide template remote from said terminating station, said deflecting means comprising a plurality of fingers at said first fixed spacing, said fingers moving transversely of the planar array to deflect the wires, the innermost leads in said array being deflected more than the outermost leads, whereby, a planar array of wires with the leading ends delivered to the template in a rectilinear array is modified to non-planar array with the leading ends in an arcuate array with the innermost leads at the concavity of the arcuate array, and the wire spreading means restores the leading ends to a rectilinear array as the wires are spread into the grooves in the template by the wiper assembly.

5. The apparatus of claim 1 which further comprises:

an insertion station on said first path between said operating zone and said point remote therefrom, connector housing feed means for feeding a connector housing having cavities therein at said first fixed spacing to said insertion station, said housing feed means comprising a reciprocable housing transfer carriage travelling on a second path substantially normal to said first path, said second path extending from said insertion station on said first path to a point remote therefrom, said carriage having securing means for securing said connector housing to said carriage and for positioning said housing at said insertion station with said cavities aligned to axially receive the leading ends of the wires, whereby, said shuttle may pass through said insertion station toward said operating zone to terminate the leading ends of the wires when said housing transfer carriage is remote from said insertion station, said carriage may be advanced to said insertion station when said shuttle is remote from said operating zone, and said shuttle may axially insert the leading ends of terminated wires into cavities in the connector housing at said first fixed spacing.

6. The apparatus of claim 5 which further comprises a shearing station on said first path remote from said insertion station and said operating zone, said shearing station having an open position which allows passage of said shuttle therethrough, whereby, said terminated ends may be inserted into said housing at said inserting station, said gripping means may be released, said shuttle may be moved on said first path away from said insertion station until said shuttle clears the shearing station, and the wires may be sheared at a point remote from the insertion station.

7. A method of terminating the leading ends of a plurality of wires to a like plurality of terminals having second fixed spacing in a rectilinear array and inserting the terminated ends into a like plurality of cavities having a first fixed spacing in a rectilinear array in a connector housing comprises the steps of:

gripping said wires on portions thereof remote from said leading ends and advancing said wires axially in a planar parallel array having a first fixed spacing with the leading ends in a rectilinear array along a path to a terminating station, deflecting said wires transversely of the planar array at a point between said terminating station and said gripped portions, the innermost leads in said array being deflected more than the outermost leads, said leading ends thereby being modified to an arcuate array with the ends of the innermost leads at the concavity of the arcuate array, spreading said leading ends to a second fixed spacing, said ends being spread enough to restore them from said arcuate array to a rectilinear array, positioning a like plurality of terminals at said second fixed spacing at said terminating station adjacent said leading ends and terminating said leading ends to said terminals, retracting said wires from said terminating station along said path and reversing said deflection and reversing said spreading so that said terminated ends are restored to said first fixed spacing in a rectilinear array at a point remote from the terminating station, positioning said connector housing on said path between said remote point and said terminating station, advancing said wires until said terminated ends are inserted in said cavities.

8. A method of terminating the ends of a plurality of wires to a like plurality of terminals having a second fixed spacing in a linear array and inserting the terminated ends into a like plurality of cavities having a first fixed spacing in a linear array in a connector housing comprises the steps of:

gripping said wires in a planar parallel array at said first fixed spacing at portions thereof remote from said ends and delivering said ends to a terminating station, said wires being gripped so that the ends are in a rectilinear array when the wires are parallel between said gripped portions and said ends.

deflecting said wires transversely of the planar array at a point between said terminating station and said gripped portions, the innermost wires being deflected more than the outermost wires, said ends thereby being modified to an arcuate array when the wires are parallel between said gripped portions and said ends, spreading said ends to a second fixed spacing in a planar guide template having grooves therein, said grooves having first portions at said first fixed spacing remote from said terminating station and second portions at said second fixed spacing adjacent to said terminating station, said second spacing being sufficient to align ends to a rectilinear array when the wires are spread into the grooves, said wires being spread into the grooves by a wiper assembly which wipes the wires into the grooves from the first portions toward the second portions, positioning a like plurality of terminals at said second fixed spacing at said terminating station adjacent said ends and terminating said ends to said terminals, restoring said ends to said first fixed spacing and inserting said ends into cavities in a connector housing at an insertion station, said ends being inserted by relative axial movement between the ends and the housing.

9. The method of claim 8 wherein said ends of said wires are delivered to said terminating station by axial movement.

10. The method of claim 8 wherein said ends of said wires are delivered from said terminating station to said insertion station by axial movement.

11. The method of claim 9 or claim 10 wherein said axial movements are effected by a shuttle having a like plurlity of elongated wire guide tubes in a planar parallel array at said first fixed spacing, each guide tube having two telescoping parts and closely accommodating a single wire, said shuttle having releaseable wire gripping means effective to hold the wires stationary with respect to the outermost of the telescoping parts, said shuttle being reciprocable along the axes of the wires, said ends being delivered by collapsing the telescoping parts to extrude the ends therefrom as the shuttle moves and the gripping means hold the wires stationary with respect to the outermost of the telescoping parts.

* * * * *